United States Patent [19]

Chung et al.

[11] Patent Number: 4,686,688
[45] Date of Patent: Aug. 11, 1987

[54] ARRANGEMENT FOR GENERATING AN ANGLE-MODULATED CARRIER SIGNAL OF A CONSTANT AMPLITUDE IN RESPONSE TO DATA SIGNALS

[75] Inventors: Kah-Seng Chung, Eindhoven; Hendrikus L. Verstappen, Hilversum, both of Netherlands

[73] Assignee: U.S. Philips Corporation, New York, N.Y.

[21] Appl. No.: 755,637

[22] Filed: Jul. 16, 1985

[30] Foreign Application Priority Data

Jul. 23, 1984 [NL] Netherlands ............... 8402318

[51] Int. Cl.⁴ .................. H04L 27/12; H03K 7/06
[52] U.S. Cl. .......................... 375/47; 375/53; 375/64; 375/67; 332/16 R
[58] Field of Search ............ 364/721; 332/16 R; 375/17, 19, 47, 52, 53, 54, 64, 67

[56] References Cited

U.S. PATENT DOCUMENTS

| | | | |
|---|---|---|---|
| 3,898,446 | 8/1975 | Vatz | 364/721 |
| 4,024,385 | 5/1977 | Richards | 364/721 |
| 4,229,821 | 10/1980 | de Jager et al. | 375/53 |
| 4,410,955 | 10/1983 | Burke et al. | 364/721 |

*Primary Examiner*—Robert L. Griffin
*Assistant Examiner*—M. Huseman
*Attorney, Agent, or Firm*—Marianne Rich; William J. Streeter; Anne E. Barschall

[57] ABSTRACT

An arrangement for generating an angle-modulated carrier signal of a constant amplitude and continuous phase $\phi(t)$ comprises a control circuit which in response to a given number of consecutive data symbols of symbol frequency $1/T$ produces addresses at a clock frequency $4q/T$; where q is an integer greater than 1, and further produces phase state numbers for characterizing the value modulo-$2\pi$ or $\phi(t)$ at the boundaries of the symbol intervals. Connected to the control circuit is a signal processor comprising a read-only memory for storing values representing cos $\phi(t)$ and sin $\phi(t)$ at the clock instants, which values are processed after reading to form the analog angle-modulated signal. An arrangement having a comparatively small capacity of the read-only memory is obtained by providing that storage in this read-only memory is only effected for non-decreasing phases $\phi(t)$ and one of the phase state numbers, that the control circuit comprises an address converter for producing addresses corresponding to this storage and a generator for producing a first and a second selection signal in response to the phase state number, and that the signal processor is arranged for selectively applying at each clock instant in response to the first selection signal only one of the two values representing cos $\phi(t)$ and sin $\phi(t)$ to a DAC-circuit and for selectively inverting at each clock instant in response to the second selection signal the sign of the output sample of the DAC-circuit, these output samples constituting the samples of the analog angle-modulated carrier signal having a carrier frequency $q/T$, whereby the modulated carrier signal can be derived from these output samples with the aid of a bandpass filter.

7 Claims, 15 Drawing Figures

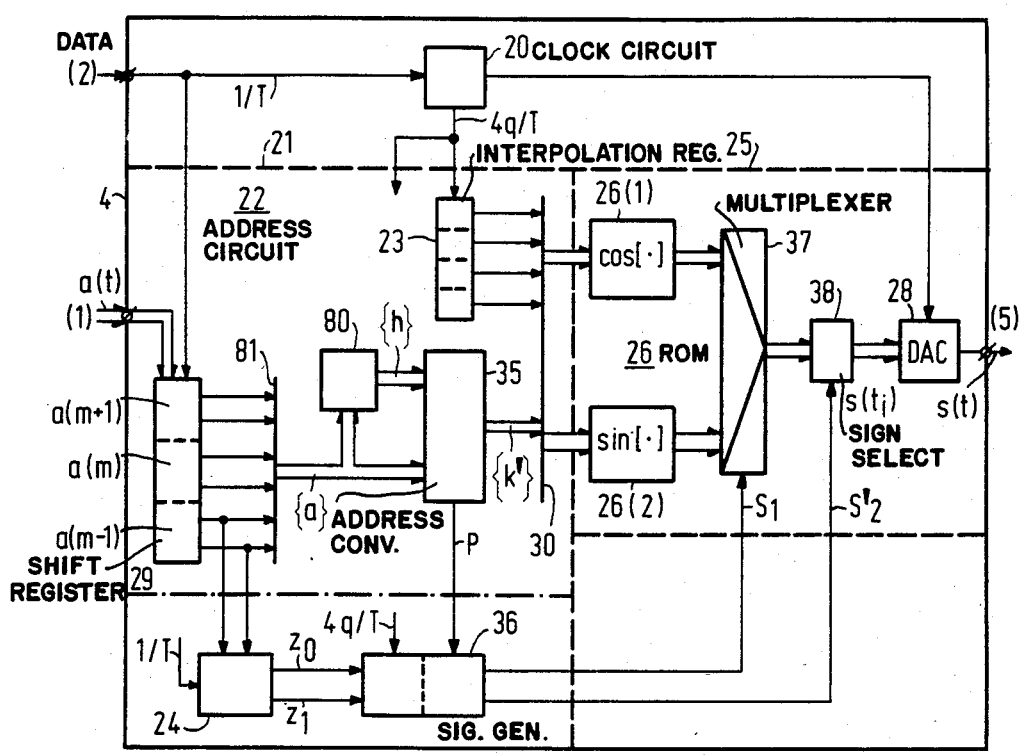
FIG.12
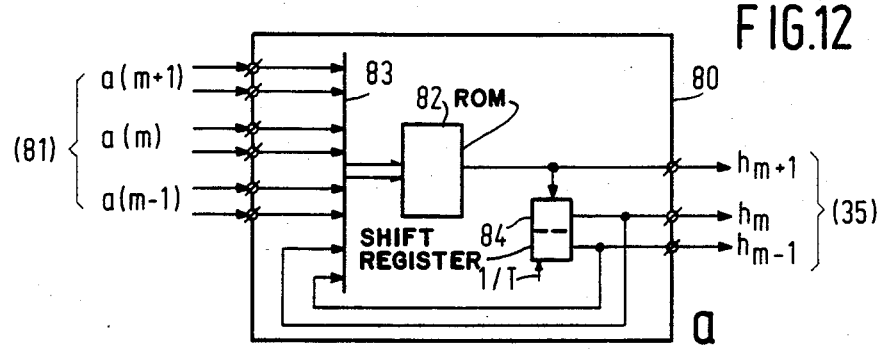
a
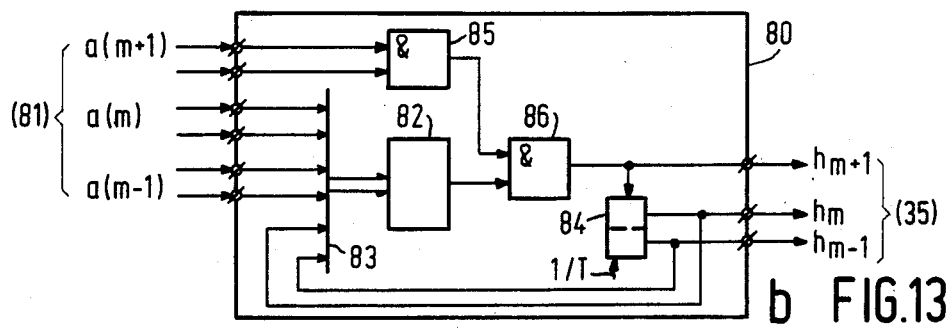
b  FIG.13

ARRANGEMENT FOR GENERATING AN ANGLE-MODULATED CARRIER SIGNAL OF A CONSTANT AMPLITUDE IN RESPONSE TO DATA SIGNALS

BACKGROUND OF THE INVENTION

The invention relates to an arrangement for generating an analog-modulated carrier signal having a substantially constant amplitude and a continuous phase $\phi(t)$ in response to data signals of a given symbol frequency $1/T$. The arrangement comprises: a clock circuit synchronized with the symbol frequency for producing a clock signal having a frequency $4q/T$, where q is an integer greater than 1; a control circuit comprising an addressing circuit controlled by the clock signal and including an interpolation counter and responsive to a given number of consecutive data symbols for producing addresses having a frequency $4q/T$, and a counter controlled by the symbol frequency and responsive to the data symbols for producing phase state numbers which characterize the value modulo-$2\pi$ of the the phase $\phi(t)$ at the boundaries of the symbol intervals of the length T. A signal processor is connected to the control circuit and comprises a first read-only memory for storing in addressable locations digital numerical values which are representative of the signals $\cos \phi(t)$ and $\sin \phi(t)$ at the instants determined by the clock signals, the stored values being read from the locations of the first read-only memory under the control of the addressing circuit. The values read are processed to form the analog angle-modulated carrier signal with the aid of digital-to-analog conversion.

Such an arrangement is known from the article by De Jager and Dekker on TFM (Tamed Frequency Modulation) in IEEE Transactions on Communications, Vol. COM-26, No. 5, May 1978, pages 534-542, (see FIG. 15) and from U.S. Pat. No. 4,229,821 (see FIG. 18). In a symbol interval of length T, the phase $\phi(t)$ of a TFM-signal changes by not more than an amount of $\pm\pi/2$ rad. and the value modulo-$2\pi$ of the phase $\phi(t)$ always remains within this interval in the same phase quadrant $[y\pi/2, (y+1)\pi/2]$ with $y=0, 1, 2$ or 3 at an appropriate choice of $\phi(t)$ at the reference instant $t=0$. A possible transition to a different phase quadrant is only effected at the boundaries of the symbol intervals. For a TFM-signal the phase state number is the phase quadrant number y modulo-4. In the prior art arrangement, this phase quadrant number is obtained as a counting position of a modulo-4 up/down counter controlled by the data symbols, and is utilized there as part of the read address for the first read-only memory of the signal processor. The digital numerical values read are converted into two analog signals $\cos \phi(t)$ and $\sin \phi(t)$ by means of two DAC-circuits (Digital-to-Analog Conversion circuits). The two analog signals are applied through two low-pass filters for suppressing undesired signal components at the frequency $4q/T$ and multiples thereof to an analog quadrature modulation circuit, where they are multiplied by two carriers in phase-quadrature with the aid of two product modulators. The TFM-signal is obtained with the aid of an adder connected to the product modulators.

As the interface between the digital and analog signal-processing section lies immediately after the first read-only memory, these known arrangements have a pronounced hybrid structure and particularly stringent requirements are imposed on the circuit implementation of the analog section, both as regards the equality of the amplitude and the phase characteristics of the two signal paths and the unavoidable d.c. voltage offsets occurring therein. Also, a high regard for the accuracy of the phase quadrature of the two carriers must be maintained to prevent undesired amplitude and phase variations, undesired sidebands and insufficient carrier suppression from occurring in the TFM-signal at the output.

A possible way to avoid the above-mentioned disadvantages is to replace the constitutuent parts of the analog quadrature modulation circuit (product modulators, carrier oscillator and adder) by their digital equivalents which are known per se. These equivalents are arranged for processing signal samples at the rate $rq/T$ of the clock signal and to connect directly the digital quadrature modulation circuit thus obtained to the first readonly memory. The interface between the digital and analog sections is then shifted to the output of the quadrature modulation circuit and consequently only one DAC-circuit is required for obtaining the TFM-signal. For a practical implementation, the predominantly digital structure thus obtained is, however, still not attractive in view of the digital multipliers required in the quadrature modulation circuit which limit the maximum permissible data symbol rate $1/T$.

In the article by Chung and Zegers on GTFM (Generalized TFM), published in Philips Journal of Research, Vol. 37, No. 4, 1982, pages 165-177 it is stated (see page 169) that this restriction can be eliminated by choosing an appropriate value for the carrier frequency (for example equal to one quarter of the frequency $4q/T$ of the clock signal) and by then combining the functions of the first read-only memory and the digital quadrature modulation circuit. The digital numerical values stored in the first read-only memory then represent samples of the analog GTFM-signal and consequently the DAC-circuit can be connected directly to the first read-only memory. The arrangement thus obtained is particularly attractive for monolithic integration and can process a large range of data symbol rates, for example from 2.4 kbit/s to 72 kbit/s. This technique is not limited to the generation of (G)TFM-signals, but alternatively may be used for a wide variety of other modulation methods, such as n-PRCPM (n-ary Partial Response Continuous Phase Modulation) and CORPSK (Correlative Phase Shift Keying) described in the article by Aulin, Rydbeck and Sundberg and the article by Muilwijk in IEEE Transactions on Communications, Vol. COM-29, No. 3, March 1981, pages 210-225 and pages 226-236, respectively, and GMSK (Gaussian Minimum Shift Keying) described in the article by Murota and Hirade in IEEE Transactions on Communications, Vol. COM-29, No. 7, July 1981, pages 1044-1050. For some applications of this technique the required storage capacity may still be objectionable.

SUMMARY OF THE INVENTION

The invention has for its object to provide an arrangement of the type described for generating (G)TFM-signals, GMSK-signals and several types of CORPSK-signals and CPM-signals with phase changes per symbol interval equal to $\pm\pi/2$ rad. or multiples thereof. A structure which is attractive for monolithic integration is provided by a relatively small storage capacity of the first read-only memory.

According to the invention, the first read-only memory is arranged for storing only the values representing signals cos φ(t) and sin φ(t) for non-decreasing phases φ(t) associated with one predetermined phase number. The addressing circuit comprises an address converter responsive to said given number of consecutive data symbols for producing addresses for non-decreasing phases φ(t) associated with said predetermined phase state number and a conversion indication signal. The control circuit further comprises a generator controlled by the clock signal and responsive to the phase state number for producing a first and a second selection signal. The signal processor is arranged for selectively applying at each clock instant in response to the first selection signal only one of the two values representing the signals cos φ(t) and sin φ(t) to a digital-to-analog converter and for selectively inverting at each clock instant in response to the second selection signal the sign of the output sample of the digital-to-analog converter. These output samples constitute the samples of the analog angle-modulated carrier signal at a carrier frequency q/T, whereby said carrier signal can be derived from said output samples with the aif of a bandpass filter.

BRIEF DESCRIPTION OF THE DRAWINGS

Embodiment of the invention and their advantages will now be described in greater detail by way of example with reference to the accompanying drawings.

FIG. 12 shows a block diagram of a third embodiment of an arrangement according to the invention for generating a CORPSK (4–5) signal;

FIG. 13 shows block diagrams of embodiments of a non-linear correlative encoding circuit suitable for use in the arrangement of FIG. 12;

DESCRIPTION OF THE EMBODIMENTS

General Description

Figure 1:
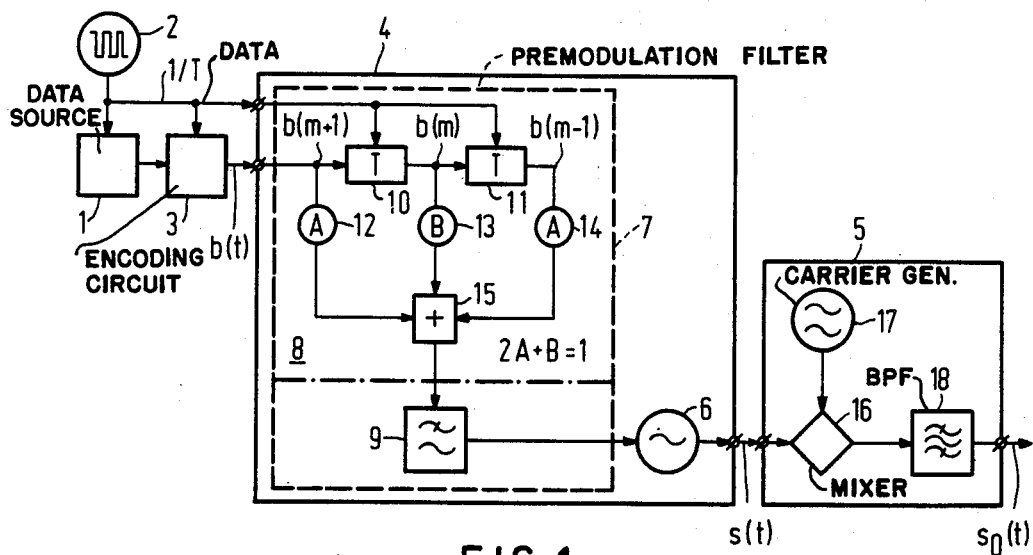
FIG. 1 shows a prior art basic diagram of a GTFM-transmitter.

As the description of the arrangement for generating an angle-modulated carrier signal of a substantially constant amplitude and continuous phase φ(t) is given for the case of a TTFM-signal, a basic circuit diagram of a GTFM-transmitter will now first be described with reference to FIG. 1. This circuit diagram of FIG. 1 is a modification of the basic circuit diagram of a TFM-transmitter as disclosed in U.S. Pat. No. 4,229,821.

The transmitter in FIG. 1 comprises a data signal source 1 synchronized by a clock signal source 2. The binary data signals derived from source 1 at a symbol rate 1/T are applied through a differential encoding circuit 3 to an arrangement 4 for generating an angle-modulated carrier signal of a substantially constant amplitude and continuous phase φ(t). This modulated signal is applied to the transmission channel through an output circuit 5, in which both power amplification and also conversion to the frequency band of the transmission channel can be effected.

In FIG. 1 arrangement 4 is constituted by a frequency modulator with an ideal voltage-controlled oscillator 6, whose rest frequency is always equal to the desired (intermediate) carrier frequency $f_c$ and whose gain constant is always equal to $\pi/(2T)$ rad per volt sec., the differentially encoded binary data signal being applied to this oscillator 6 through a premodulation filter 7. This premodulation filter 7 comprises a partial-response-encoding circuit 8 and a low-pass filter 9, whose transfer function satisfies the third Nyquist criterion. Encoding circuit 8 is constituted by a transversal filter having two delay elements 10, 11, each producing a time delay equal to one symbol period T and each connected to an adder 15 through a respective weighting circuit 12, 13 and 14 having weighting factors equal to A, B, A, respectively. These weighting factors A, B are in the range from 0 to 1 and satisfy the condition: $2A+B=1$. In the event of TFM, $B=0.5$ and thus $A=0.25$.

At the output of oscillator 6 a GTFM-signal s(t) is produced which can be expressed as:

$$s(t) = \sin[\omega_c t + \phi(t)] \quad (1)$$

where $\omega = 2\pi f_c$ and $f_c$ is the (intermediate) carrier frequency. As is demonstrated for TFM in U.S. Pat. No. 4,229,821, there exists between the phase φ(t) and the differentially encoded binary data signal b(t) applied to arrangement 4 a relationship such that the amount of the phase change over a symbol period T between the instants $t=mT$ and $t=MT+T$, where m is an integer, is given by:

$$\phi(mT+T) - \phi(mT) = [Ab(m-1) + Bb(m) + Ab(m+1)]\pi/2 \quad (2)$$

where b(m)[with $b(m)=\pm 1$] represents a symbol of data signal b(t) in symbol interval (mT, mT+T). In addition, it is demonstrated that the shape of the phase φ(t) for instants t within this symbol interval (mT, mT+T) depends on the specific choice of low-pass filter 9 satisfying the third Nyquist criterion, but that for each choice this shape is determined predominantly by the filtered version of the three successive data symbols b(m−1), b(m), b(m+1), mentioned in formula (2), at the output of premodulation filter 7.

The GTFM-signal GTFM-signal s(t) thus obtained has many properties desirable for an efficient further processing in the practical embodiments of output circuit 5 such as they are used in radio communication systems. In FIG. 1, this output circuit is arranged as a frequency converter comprising a mixer stage 16, a carrier source 17 and a bandpass filter 18 for obtaining a GTFM-signal $s_o(t)$ with a higher carrier frequency $f_o$ than the intermediate) carrier frequency $f_c$, where $s_o(t)$ can be expressed as:

$$s_o(t) = \sin[\omega_o t + \phi(t)] \quad (3)$$

with $\omega_o = 2\pi f_o$. For that purpose source 17 produces a carrier signal of a constant amplitude and frequency $f_o - f_c$ which is mixed with the GTFM-signal s(t) originating from oscillator 6 in mixer state 16, whereafter the mixing product at the sum frequency $(f_o - f_c) + f_c = f_o$ is selected by means of bandpass filter 18. Since this GTFM-signal s(t) has a constant amplitude, no problems are encountered if in the practical embodiment of output circuit 5 use is made of components having a non-linear amplitude-transfer function for obtaining a high power efficiency. In addition, bandpass filter 18 need not satisfy special critical requirements for the selection of the signal to be applied to the transmission channel, as the GTFM-signal s(t) has a compact power density spectrum with side lobes of relatively low levels. In contrast therewith, for the practical implementation of arranngement 4, very high requirements are imposed on the analog circuits (not shown in FIG. 1) required to maintain the rest frequency and the gain constant of oscillator 6 at their prescribed values of $f_c$ and $\pi/(2T)$.

Figure 2:
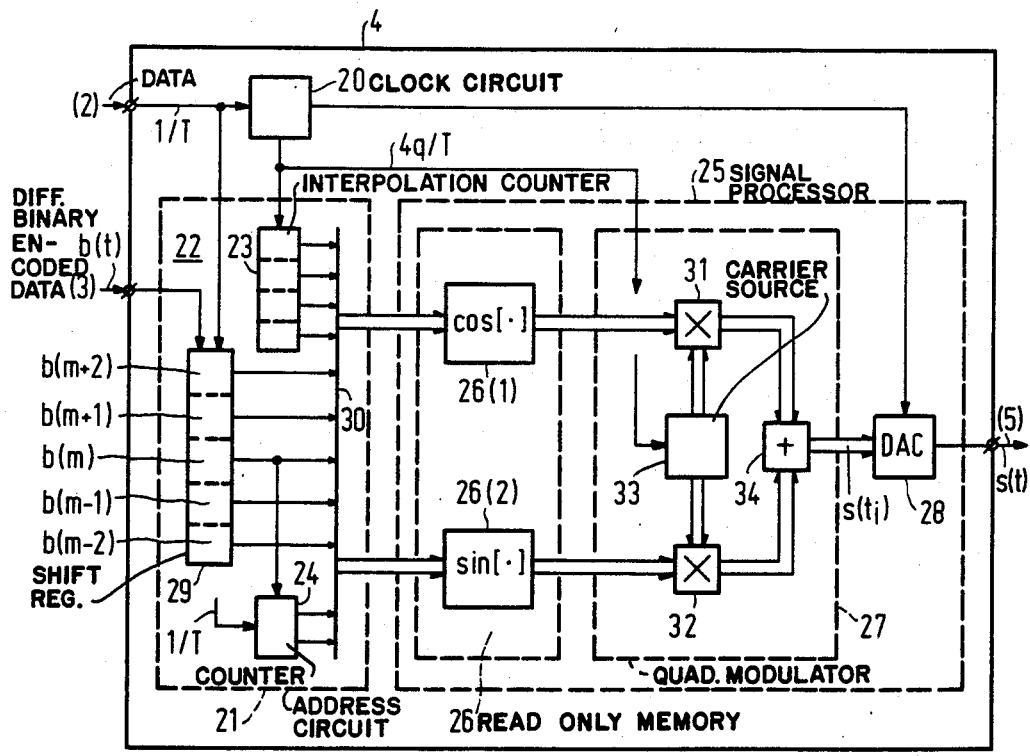
FIG. 2 shows a block diagram of a prior art practical embodiment of an arrangement for generating a GTFM-signal suitable for use in the transmitter of FIG. 1.

The problems associated with the severe requirements imposed on the control of analog circuit functions can be circumvented by implementing arrangement 4 in the manner shown in FIG. 2, which results in a predominantly digital structure. In this implementation use is made of digital signal processing techniques for realizing the premodulation filtering, in which only the most significant values of the desired impulse response g(t) of premodulation filter 7 in FIG. 1 are utilized, more specifically the values in a central interval of the length pT, where p is a small odd number. In addition, use is made of quadrature modulation for generating the GTFM-signal s(t). This embodiment is based on a circuit diagram known from the publications on TFM mentioned in paragraph (A), which circuit diagram is modified in accordance with the publication, also mentioned there, on GTFM by utilizing a digital quadrature modulation circuit.

Arrangement 4 in FIG. 2 comprises a clock circuit 20 which is synchronized with the symbol frequency 1/T of source 2 in FIG. 1 and produces a clock signal having a frequency $f_s$:

$$f_s = 1/T_s = 4q/T \quad (4)$$

where q is an integer exceeding 1. In addition, arrangement 4 comprises a control circuit 21 which includes an addressing circuit 22, controlled by this clock signal, with an interpolation counter 23 for producing addresses at a frequency $f_s = 4q/T$ and a counter 24 controlled by the symbol frequency 1/T for producing phase state numbers characterizing the value modulo-$2\pi$ of the phase $\phi(t)$ at the boundaries of the symbol intervals. Connected to this control circuit 21 is a signal processor 25 comprising a first read-only memory 26 having two memory sections 26(1) and 26(2), in the addressable location of which digital numeral values are stored which are representative of the signals cos $\phi(t)$ and sin $\phi(t)$ at the instants $t_i$, determined by the clock signal of frequency $f_s$:

$$t_i = i T_s \quad (5)$$

where i is an integer. The discrete signal samples cos $[\phi(t_i)]$ and sin $[\phi(t_i)]$ read from memory sections 26(1) and 26(2) are processed in a digital quadrature modulator 27 to discrete signal samples $s(t_i)$ of the form:

$$s(t_i) = \sin[\omega_c t_i + \phi(t_i)] \quad (6)$$

which are applied to a DAC-circuit 28, controlled by clock circuit 20, for producing the corresponding analog GTFM-signal s(t).

In addressing circuit 22, the differentially encoded binary data signal b(t) of encoding circuit 3 in FIG. 1 is applied to a series-to-parallel converter 29 in the form of a shift register, whose contents are shifted at the symbol rate 1WT. This shift register 29 comprises a number of p elements equal to the number of symbol periods to which the length pT of the central interval of impulse response g(t) is limited. The shape of the phase $\phi(t)$ within one symbol interval of length T is then fully determined by this impulse response g(t) limited to a length pT and the p data symbols then contained in shift register 29, so that $2^p$ shapes of phase $\phi(t)$ are possible within one symbol interval; in FIG. 2 the choice p=5 is made and thus $2^p = 2^5 = 32$. The first part of the addresses produced by addressing circuit 22 for reading first read-only memory 26 during the symbol interval (mT, mT + T) is then formed by the data symbols b(m−2), b(m−1), b(m), b(m+1), b(m+2) contained in shift register 29. These read addresses are produced at a rate $f_s = 4q/T$, the interpolation factor 4q being the number of discrete signal samples to be read in each symbol interval of length T. To that end, interpolation counter 23 is constituted by a modulo-4q counter, whose counting input receives the clock signal of the frequency $f_s = 4q/T$ from clock circuit 20 and whose counting position functions as the second part of the read addresses; in FIG. 2 the choice q=4 is made and thus 4q=16 and counter 23 is a modulo-16 counter.

From formula (2) it follows that the phase $\phi(t)$ between the instants t=mT and $t = mT + T$ can change by not more than an amount of $\pm \pi/2$ rad and that within this time interval the value modulo-$2\pi$ of the phase $\phi(t)$ always remains in the same phase quadrant[$y\pi/2$, $(y+1)\pi/2$] with y=0, 1, 2 or 3 at an appropriate choice of $\phi(t)$ at the reference instant t=0, whereas a possible transition to a different phase quadrant is only effected at the instant $t = mT + T$. To characterize the value modulo-$2\pi$ of the phase $\phi(t)$ at the boundaries of the symbol intervals by means of phase state numbers, use can be made in this case of the phase quadrant numbers y modulo-4. From formula (2) it can be derived that there exists a relationship in accordance with the following Table I between the quadrant number y(m) modulo-4 for the symbol interval (mT, mT+T), the previous number y(m−1) modulo-4 and the data symbols b(m−1), b(m).

TABLE I

| b(m − 1) | b(m) | y(m) |
|---|---|---|
| +1 | +1 | y(m − 1) + 1 |
| +1 | −1 | y(m − 1) |
| −1 | +1 | y(m − 1) |
| −1 | −1 | y(m − 1) − 1 |

In FIG. 2, the quadrant number functioning as a phase state number is obtained by implementing counter 24 as a modified modulo-4 up/down counter, to which the data symbol b(m) of shift register 29 is applied and whose counting position is the quadrant y(m) modulo-4, the counting position y(m) being related to the previous counting position y(m−1) and the data symbols b(m−1), b(m) in accordance with Table I. As the values stored in the memory sections 26(1), 26(2) represent the respective signals cos $\phi(t)$, sin $\phi(t)$ and these signals still depend on the quadrant number y(m) modulo-4 indicating in which phase quadrant $\phi(t)$ is located for the considered symbol interval (mT, mT+T), the storage of the values representing cos $\phi(t)$, sin $\phi(t)$ for the $2^p = 32$ possible shapes of $\phi(t)$ must be effected for each phase quadrant. Consequently the counting position of quadrant counter 24 in FIG. 2 forms the third part of the read addresses. In FIG. 2 these read addresses have a width of 11 bits (5 bits for the contents of shift register 29, 4 bits for the counting position of interpolation counter 23 and 2 bits for the counting position of quadrant counter 24) and are applied to both sections 26(1) and 26(2) of read-only memory 26 through an address bus 30.

The discrete signal samples cos $[\phi(t_i)]$ and sin $[\phi(t_i)]$ read from memory sections 26(1) and 26(2) are applied to a quadrature modulator 27, where they are multiplied, with the aid of digital multipliers 31 and 32, by respective discrete signal samples sin $(\omega_c t_i)$ and cos $(\omega_c t_i)$ of two phase-quadrature carriers originating from a digital carrier signal source 33 synchronized with the clock signal of frequency $f_s = 4q/T$. The output signals of multipliers 31, 32 are summed with the aid of a digital adder 34 producing a digital sum signal $s(t_i)$ which is given by:

$$s(t_i) = \cos[\phi(t_i)]\sin(\omega_c t_i) + \sin[\phi(t_i)]\cos(\omega_c t_i) \quad (7)$$

and which can be written as:

$$s(t_i) = \sin[\omega_c t_i + \phi(t_i)] \quad (8)$$

so that at the output of DAC-circuit 28 the GTFM-signal s(t) is obtained with the desired phase $\phi(t)$.

In spite of the predominantly digital structure of arrangement 4, the direct implementation of the structure of FIG. 2 is not very attractive for practical purposes because of the digital multipliers 31, 32 required in quadrature modulator 27 which limit the maximum permissible data symbol rate 1/T. In accordance with the publication on GTFM mentioned in section (A), this restriction can be circumvented by an appropriate choice of the ratio between the frequency $f_s = 1/T_s$ of the signal samples $s(t_i)$ of the GTFM-signal and the (intermediate) carrier frequency $f_c$. If now this (intermediate) carrier frequency $f_c$ is chosen to be equal to one quarter of the sampling rate $f_s$, i.e.:

$$f_c = f_s/4 = 1/(4T_s) \quad (9)$$

it follows for the carrier samples at the instants $t_i = iT_s$ that:

$$\sin(\omega_c t_i) = \sin(2\pi f_c i T_s) = \sin(i\pi/2) \quad (10)$$

$$\cos(\omega_c t_i) = \cos(2\pi f_c i T_s) = \cos(i\pi/2) \quad (i\pi/2)$$

and formula (7) for the signal samples $s(t_i)$ can be written as:

$$s(iT_s) = \cos[\phi(iT_s)]\sin(i\pi/2) + \sin[\phi(iT_s)]0\cos(i\pi/2)$$

From formula (11) it follows that only trivial multiplications by ±1 or 0 are required, so that no physical multipliers are required for the quadrature modulation. It further follows that for each value of the integer i, either $\sin(i\pi/2)$ or $\cos(i\pi/2)$ is non-zero, but not both of them, so that no physical adder is required for the quadrature modulation. The quadrature modulation then amounts to a sign inversion procedure effected at a rate equal to half the sampling rate $f_s/2$. This sign inversion can be effected implicitly in the first read-only memory 26 by accommodating the sign required for the quadrature modulation in the sign of the stored signal samples cos $[\phi(iT_s)]$ and sin $[\phi(iT_s)]$. Because of this choice of the intermediate) carrier frequency $f_c$ quadrature modulator 27 can be omitted in FIG. 2 and DAC-circuit 28 can be directly connected to the two sections 26(1) and 26(2) of the first read-only memory 26. The arrangement 4 thus obtained is particularly attractive for monolithic integration and can process a wide range of data symbol rates 1/T, for example from 2.4 kbit/s to 72 kbit/s, without any other external circuit setting other than the synchronization of clock circuit 20 with the data symbol rate 1/T.

In applications such as mobile radio communication systems in which a lowest possible power consumption is a constraint, the power dissipation associated with the required memory capacity in this arrangement 4 of FIG. 2 can yet be objectionable.

In addition to the factors already discussed in the foregoing, this memory capacity is determined by the constraint of a low noise floor in the spectrum of the GTFM-signal, which noise floor is determined by the inaccuracy of DAC-circuit 28. When the signal samples $s(t_i)$ at the input of DAC-circuit 28 are quantized with M bits (inclusive of the sign bit) and 4q signal samples $s(t_i)$ occur in each symbol period T, then the noise floor NF produced by this quantization in the normalized power density spectrum P/T of the GTFM-signal s(t) can be written as:

$$NF = 12q \cdot 2^{2M-1} \quad (12)$$

In the case of an (intermediate) carrier frequency $f_c = f_s/4$ the values stored in memory sections 26(1) and 26(2) are then also quantized with M bits (adder 34 is then missing). A noise floor NF approximately 90 dB lower than the level of the spectrum P/T for the carrier frequency $f_c$ then implies that, with the value 4q=16 already mentioned, a value M=12 is necessary for M. Then the capacity required in read-only memory 26 generally amounts to:

$$2 \times 4 \times 2^p \times 4q \times M \text{ bits} \quad (13)$$

the factor 2 in formula (13) representing the two sections 26(1) and 26(2), the factor 4 representing the phase quadrant, the factor $2^p$ representing the number of possible shapes of phase $\phi(t)$ in a symbol period T with a central interval of impulse response g(t) limited to pT, the factor 4q representing the number of signal samples per symbol period T and the factor M representing the number of bits for quantizing the signal samples. When the above-mentioned values p=5, 4q=16 and M=2 are used, the capacity required in read-only memory 26 then amounts to 49152 bits (=48 K ROM with =K=1024 bits).

Figure 3:
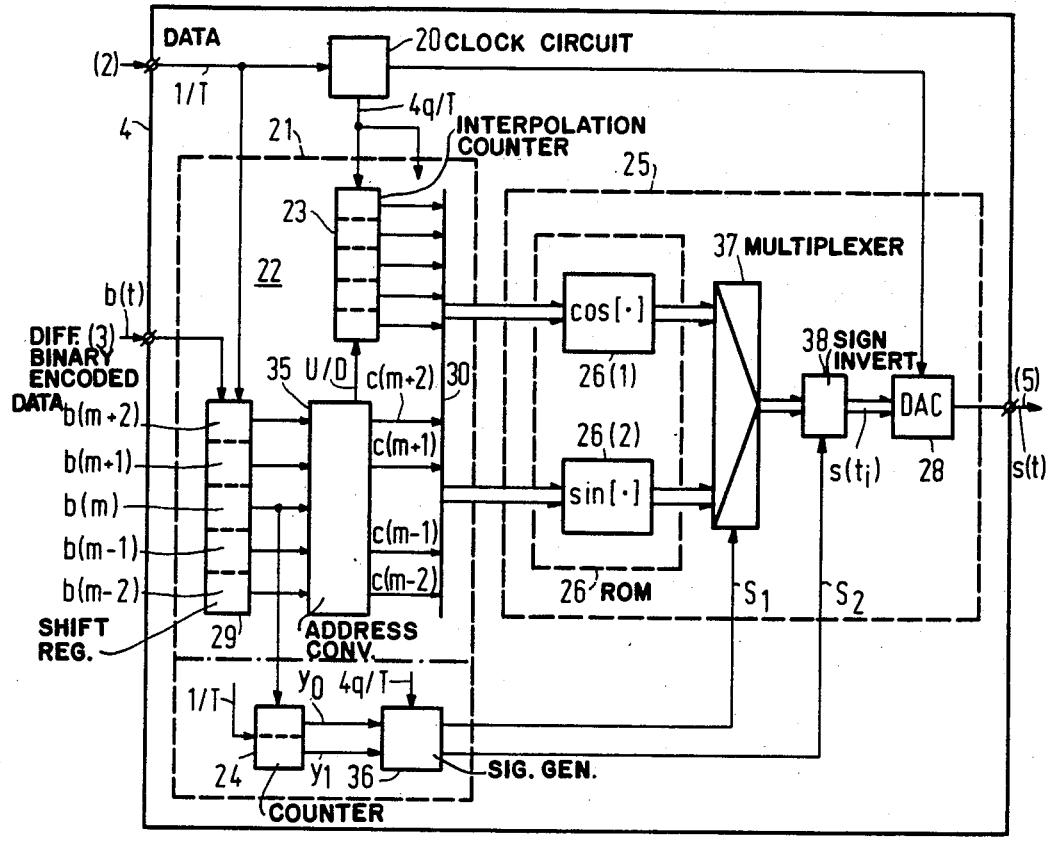
FIG. 3 shows a block diagram of a first embodiment of an arrangement according to the invention for generating a GTFM-signal.

Description of the embodiment of FIG. 3

FIG. 3 shows a block diagram of a first embodiment of an arrangement 4 according to the invention, which has an attractive structure for monolithic integration, can process a large range of data symbol rates 1/T, but requires a much smaller memory capacity for the first read-only memory 26 than does arrangement 4 of FIG. 2. Elements in FIG. 3 corresponding to those in FIG. 2 are given the same reference numerals.

In FIG. 3 first read-only memory 26 is arranged for storing only signal samples cos $[\phi(t_i)]$ and sin $[\phi(t_i)]$ for increasing values of phase $\phi(t)$ in the first phase quadrant having quadrant number y(m)=0. In addition, addressing circuit 22 comprises an address converter 35 which, in response to the data symbols b(m−2), b(m−1), b(m), b(m+1), b(m+2) in shift register 29, produces a new first part c(m−2), c(m−1), c(m+1), c(m+2) of the read address for memory 26 and a sense indication signal U/D for the interpolation counter 23 which is arranged as an up/down counter. As the data symbol b(m) in the original first part of the read address always has the value b(m)=1 for increasing values of phase $\phi(t)$ and address converter 35 produces new first parts of only this type, irrespective of the phase quadrant and/of whether phase $\phi(t)$ increases or decreases, this new first part need not contain a data symbol c(m)=+1 corresponding to the value b(m)=+1.

Control circuit 21 of FIG. 3 also incorporates a generator 36 which is controlled by the clock signal having frequency $f_s=4q/T$ and is responsive to the quadrant number y(m) of quadrant counter 24 for producing two selection signals $S_1$ and $S_2$. In signal processor 25 of FIG. 3, the first selection signal $S_1$ is applied to a 2-input multiplexer 37 which is connected to section 26(1) and section 26(2) of first read-only memory 26 for applying at each clock instant $t_i$ only one of the two signal samples cos $[\phi(t_i)]$ and sin $[\phi(t_i)]$ to DAC-circuit 28 in accordance with the value of this first selection signal $S_1$. In FIG. 3 there is also provided between multiplexer 37 and DAC-circuit 28 a sign inverter 38 to which the second selection signal $S_2$ is applied for inverting or not inverting at each clock instant $t_i$ the sign of the signal samples selected in multiplexer 37 in accordance with the value of this second selection signal $S_2$, so that a signal sample $s(t_i)$ defined by formula (11) is applied to DAC-circuit 28.

Figure 4:
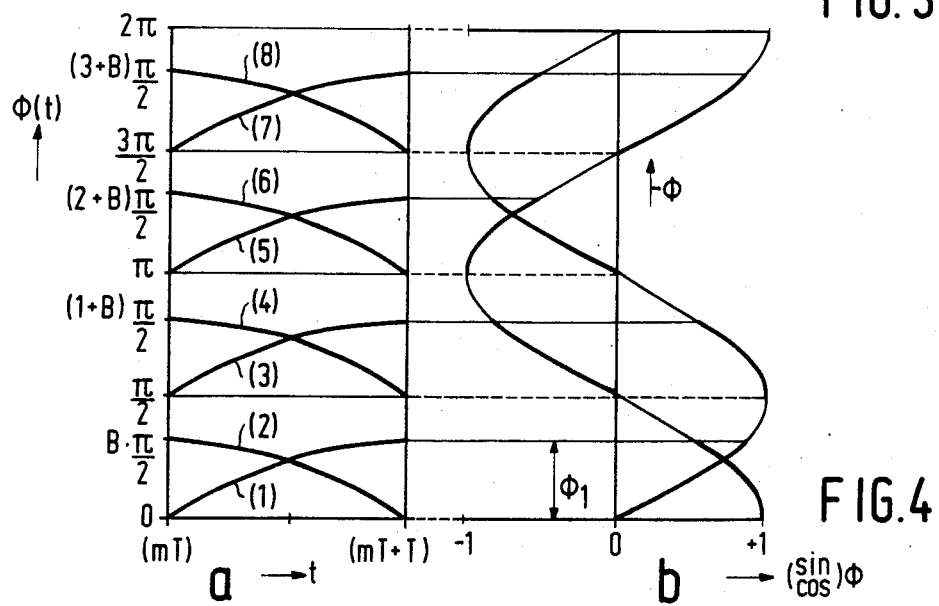
FIG. 4 shows two diagrams to explain the address conversion and the respective selections performed in the arrangement of FIG. 3.

The manner in which the address conversion and the respective selections of the signal sample and of the sign of the selected signal sample are effected in arrangement 4 of FIG. 3 will be further described with reference to the diagrams of FIG. 4. Diagram a of FIG. 4 illustrates how the phase $\phi(t)$ within a symbol interval (mT,mT+T) in each of the phase quadrants [yπ/2, (y+1)π/2] with Y=0, 1, 2 or 3 can increase from yπ/2 rad. to (y+B)π/2 rad. in accordance with curves (1), (3), (5) or (7) of identical shapes, but can alternatively decrease from (y+B/2 rad. to yπ/2 rad. in accordance with curves (2), (4), (6) or (8) of identical shapes, which are mirror-symmetrical with respect to curves (1), (3), (5) or (7) (with $t=mT+T/2$ as a reference). In diagram b the shapes of cos $\phi$ and sin $\phi$ are plotted along the horizontal axis as a function of $\phi$ along the vertical axis, the same scale being used for $\phi(t)$ in diagram a and $\phi$ in diagram b.

In sections 26(1) and 26(2) of read-only memory 26 in FIG. 3, only the values of the signal samples cos $[\phi(t_i)]$ and sin $[\phi(t_i)]$ are stored for the case in which phase $\phi(t)$ increases from 0 rad. to Bπ/2 rad. in accordance with curve (1) in diagram a of FIG. 4, the stored values indicated by cos $\phi_1$ and sin $\phi_1$ being positive and shown in diagram b by thicklines in the first quadrant (0,π/2) with number y=0. From FIG. 4 it will be evident that for the curves (1)–(8) in the quadrants (0,π/2), (π/2,π), (π,3π/2) and (3π/2, 2π) with numbers y=0, 1,2 and 3, there is a relationship between the signal samples cos $[\phi(t_i)]$ and sin $[\phi(t_i)]$ and the stored sequences of signal samples cos $\phi_1$ and sin $\phi_1$ in accordance with the following Table II, which Table also includes the encoding of quadrant number y with two bits $y_1 y_0$.

TABLE II

| y | $y_1 y_0$ | sin$[\phi(t_i)]$ | [cos $\phi(t_i)$] |
|---|---|---|---|
| 0 | 00 | sin $\phi_1$ | cos $\phi_1$ |
| 1 | 01 | cos $\phi_1$ | −sin $\phi_1$ |
| 2 | 10 | −sin $\phi_1$ | −cos $\phi_1$ |
| 3 | 11 | −cos $\phi_1$ | sin $\phi_1$ |

The stored sequences of signal values cos $\phi_1$ and sin $\phi_1$ can therefore be used for all the curves (1)–(8), but the direction in which the read-only memory 26 is read must be reversed for the case of the curves (2), (4), (6) and (8) for decreasing phase $\phi(t)$.

Because of the mirror-symmetry already mentioned in the foregoing (with $t=mT+T/2$ as a reference) it then follows that for all curves (1)–(8) there exists a relationship between the new first part c(m+j) with j=−2, −1, 0, 1, 2 and the original first part b(m+j) with j=−2, −1, 0, 1, 2 of the read address for memory 26, which relationship has the following form:

$$c_{m+j}=b_m b_{m-j}+\overline{b}_m \overline{b}_{m+j} \tag{14}$$

in which the values +1 and −1 of the data symbols c(m+j), b(m+j) are indicated by bits $c_{m+j}$, $b_{m+j}$ having the respective logic values "1" and "0". The read direction of interpolation counter 23 is then given by a sense indication bit U/D, for which it holds that:

$$U/D=b_m \tag{15}$$

so that interpolation counter 23 counts up when $U/D=b_m=$"1" and counts down when $U/D=b_m=$"0".

By writing formula (11) as:

$$s(iT_s)=\sin [i\pi/2+\phi(iT_2)] \tag{16}$$

it appears that for signal samples $s(t_i)=s(iT_s)$ at instant $t_i=iT_s$ there is the relationship of the following Table III.

TABLE III

| i modulo-4 | $s(t_i)$ |
|---|---|
| 0 | sin $\phi(iT_s)$ |
| 1 | cos $\phi(iT_s)$ |
| 2 | −sin $\phi(iT_s)$ |

TABLE III-continued

| i modulo-4 | $s(t_i)$ |
|---|---|
| 3 | $-\cos \phi(iT_s)$ |

The relationship between signal samples $s(t_i)$ at instant $t_i = iT_s$ and the sequences of signal values $\cos \phi_1$ and $\sin \phi_1$ stored in the respective sections 26(1) and 26(2) can then be found by combining Tables II and III to the subsegment Table IV, in which a logic signal $f_{i1}$ is also included which has logic value "0" for even values i and logic value "1" for odd values i, and a logic signal $f_{i2}$ with logic value "0" for values i with i modulo-4=0,1, and logic value "1" for values i with i modulo-4=2,3. The selection signals $S_1$ and $S_2$ are also included in Table IV, multiplexer 37 selecting the signal values $\cos \phi_1$ in section 26(1) at a logic value $S_1$="1" and sign inverter 38 applying the selected signal values with a positive sign to DAC-circuit 28 at a logic value $S_2$="1".

From Table IV the following relationships for the logic selection signals $S_1$ and $S_2$ can be derived:

$$S_1 = y_o \oplus f_{i1} \qquad (17)$$

$$S_2 = [\overline{y_1} \overline{y_o} + \overline{y_1} \overline{f_{i1}} + y_1 y_o f_{i1}] \oplus f_{i2} \qquad (18)$$

where $\oplus$ indicates the modulo-2 addition.

TABLE IV

| y | $y_1 y_o$ | i mod.4 | $f_{i1}$ | $f_{i2}$ | $s(t_i)$ | $S_1$ | $S_2$ |
|---|---|---|---|---|---|---|---|
| 0 | 00 | 0 | 0 | 0 | $\sin \phi_1$ | 0 | 1 |
|   |    | 1 | 1 | 0 | $\cos \phi_1$ | 1 | 1 |
|   |    | 2 | 0 | 1 | $-\sin \phi_1$ | 0 | 0 |
|   |    | 3 | 1 | 1 | $-\cos \phi_1$ | 1 | 0 |
| 1 | 01 | 0 | 0 | 0 | $\cos \phi_1$ | 1 | 1 |
|   |    | 1 | 1 | 0 | $-\sin \phi_1$ | 0 | 0 |
|   |    | 2 | 0 | 1 | $-\cos \phi_1$ | 1 | 0 |
|   |    | 3 | 1 | 1 | $\sin \phi_1$ | 0 | 1 |
| 2 | 10 | 0 | 0 | 0 | $-\sin \phi_1$ | 0 | 0 |
|   |    | 1 | 1 | 0 | $-\cos \phi_1$ | 1 | 0 |
|   |    | 2 | 0 | 1 | $\sin \phi_1$ | 0 | 1 |
|   |    | 3 | 1 | 1 | $\cos \phi_1$ | 1 | 1 |
| 3 | 11 | 0 | 0 | 0 | $-\cos \phi_1$ | 1 | 0 |
|   |    | 1 | 1 | 0 | $\sin \phi_1$ | 0 | 1 |
|   |    | 2 | 0 | 1 | $\cos \phi_1$ | 1 | 1 |
|   |    | 3 | 1 | 1 | $-\sin \phi_1$ | 0 | 0 |

Figure 5:
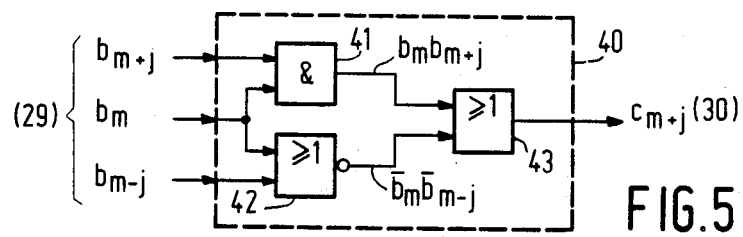
FIGS. 5 and 6 show block diagrams of an embodiment of a subcircuit for the address converter and of a selection signal generator, respectively, suitable for use in the arrangement of FIG. 3.

On the basis of formulae (14) and (15) it then follows that address converter 35 can be realized as a logic circuit having for each bit $c_{m+j}$ with $j = -2, -1, 1, 2$ a subcircuit 40 in accordance with the circuit diagram of FIG. 5, comprising an AND-gate 41, a NOR-gate 42 and an OR-gate 43. Address converter 35 then comprises 12 logic gates and a through-connection for sense indication bit $U/D = b_m$.

Figure 6:
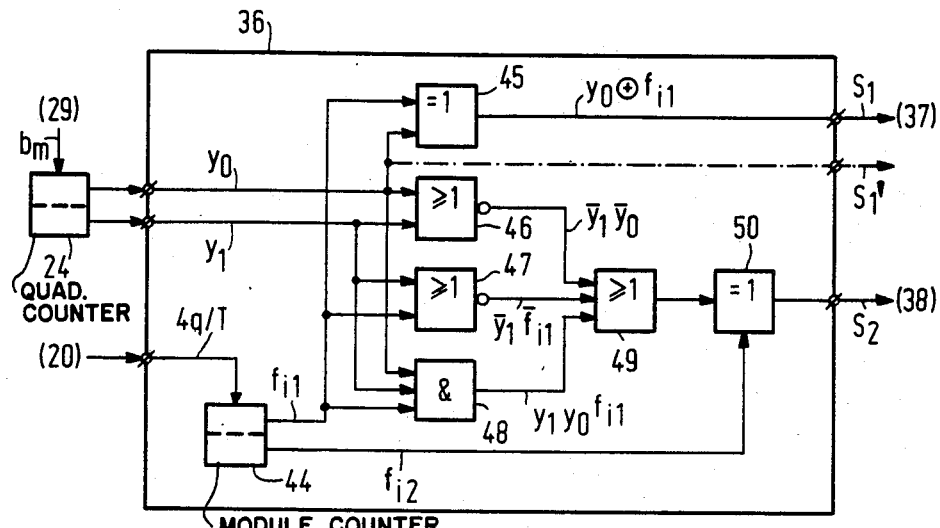

On the basis of formulae (17) and (18) it also follows that selection signal generator 36 can be realized with the aid of a logic circuit in accordance with the diagram of FIG. 6. The required logic signals $f_{i1}$ and $f_{i2}$ can be obtained, in accordance with their definition, at the output of the first and second stages of a modulo-4 counter 44, whose counting input receives the clock signal of sampling frequency $f_s = 4q/T$ from clock circuit 20. Consequently, logic signals $f_{i1}$ and $f_{i2}$ are clock signals having a frequency $f_s/2$ and $f_s/4$. In response to these logic signals $f_{i1}$ and $f_{i2}$ and the bits $y_1 y_o$ of quadrant number y originating from quadrant counter 24, generator 36 forms selection signal $S_1$ with the aid of an EX-OR gate 45, the respective signals $\overline{y_1} \overline{y_o}$, $\overline{y_1} \overline{f_{i1}}$ and $y_1 y_o f_{i1}$ with the aid of two NOR-gates 46, 47 and an AND-gate 48 whose outputs are connected to an OR-gate 49, and finally selection signal $S_2$ with the aid of an EX-OR-gate 50 which receives the output signal from OR-gate 49 and the logic signal $f_{i2}$.

The manner in which the sign inversion is effected in signal processor 25 depends on the type of binary representation used for storing the signal values $\cos \phi_1$ and $\sin \phi_1$ in read-only memory 26, and this type itself is determined by the representation used in DAC-circuit 28. The general convention for the different binary representation is that a logic value "0" is used for a positive sign and a logic value "1" for a negative sign. When in DAC-circuit 28 use is made of the "ones complement" representation, the sign inversion implies that all the M bits (sign and magnitude bits) are complemented. Sign inverter 38 can then be implemented in accordance with circuit diagram a of FIG. 7, in which each of the M bits is applied to an EX-OR-gate 51(1)–51(M), to which also logic selection signal $S_2$ is applied through a NOT-gate 52. If no sign bit is stored in read-only memory 26 (in the described case, the values $\cos \phi_1$ and $\sin \phi_1$ are positive), EX-OR-gate 51(M) may be omitted and the sign bit for DAC-circuit 28 is formed by logic signal $\overline{S_2}$ at the output of NOT-gate 52 (dot-and-dash line in FIG. 7). When in DAC-circuit 28 use is made of the "sign-magnitude"-representation, sign inversion implies that only the sign bit is complemented. Sign inverter 38 can then be realized in accordance with circuit diagram b of FIG. 7, in which the magnitude bits are conveyed without change and the sign bit is applied to an EX-OR-gate 53, to which also the logic selection signal $S_2$ is applied through a NOT-gate 54. Also in this case, EX-OR-gate 53 may be omitted and logic signal $\overline{S_2}$ at the output of NOT-gate 54 may be used as a sign bit for DAC-circuit 28 if no sign bit is stored in read-only memory 26.

Figure 7:
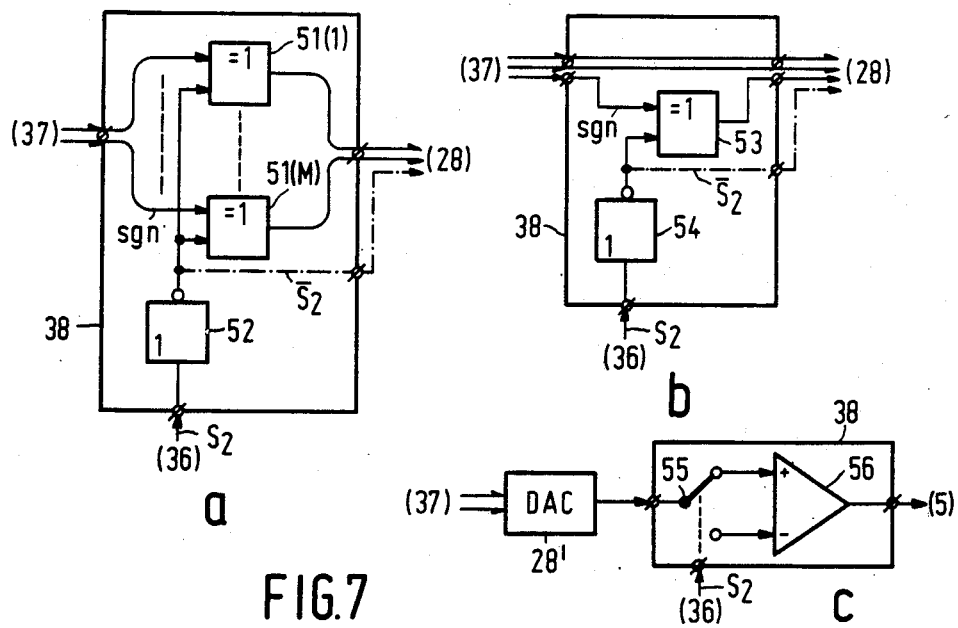
FIG. 7 shows block diagrams of a sign inverter suitable for use in the arrangement of FIG. 3.

For the case in which no sign bit is required for storage in read-only memory 26, the sign inversion may alternatively be effected in accordance with circuit diagram c of FIG. 7, in which a unipolar DAC-circuit 28′ receives only magnitude-bits from multiplexer 37 and sign inverter 38 is arranged as a polarity inverter comprising a two-position switch 55 connecting the output of DAC-circuit 28′ to the non-inverting input (+) or the inverting input (−) of an amplifier 56, depending on the logic value "1" or "0" of selection signal $S_2$.

As regards the storage of the values $\cos \phi_1$ and $\sin \phi_1$ for a phase $\phi(t)$ increasing from 0 rad. to $B\pi/2$ rad. in accordance with curve (1) in diagram a of FIG. 4, there is a difference between the read-only memories 26 of FIGS. 2 and 3. In each of both sections 26(1) and 26(2) of FIG. 2 there are then stored $4q = 16$ signal samples, more specifically for the initial value of 0 rad. of $\phi(t)$ at the instant $t = mT$ up to and including the value of $\phi(t)$ at the instant $t = mT + (4q-1) T_s = mT + 15T_s$; the two signal samples for the final value of $B\pi/2$ rad. of $\phi(t)$ at the instant $t = mT + 4q$ $T_s = mT + 16$ $T_s = mT + T$ are absent, however, since these signal samples are stored in different locations of both sections 26(1) and 26(2), more specifically for the possible shapes of phases $\phi(t)$ which change from an initial value of $B\pi/2$ rad. in accordance with curves different from curve (1) in diagram a of FIG. 4, for example in accordance with curve (2). For the case illustrated in FIG. 3, the $4q = 16$ signal samples such as they are stored in each of the two sections 26(1) and 26(2) of read-only memory 26 of FIG. 2 are sufficient, when phase $\phi(t)$ increases in accordance with curve (1) in diagram a of FIG. 4. When, however, phase $\phi(t)$ decreases in accordance with curve (2) in diagram a of FIG. 4, the stored signal samples for curve (1) must also be used for the case illustrated in FIG. 3. Then also the two signal samples for the value of $B\pi/2$ rad. of $\phi(t)$ must be available, more specifically at the instant $t = mT$, but the two stored signal samples for the value of 0 rad. of $\phi(t)$ are then not necessary, as $\phi(t)$ in accordance with curve (2) does not reach this value until the instant $t = mT + T$.

In FIG. 3 the above facts have been taken into account in that in each of the two memory sections 26(1) and 26(2) now $(4q+1) = 17$ signal samples are stored for curve (1), inclusive of the signal samples for the initial and final values of 0 rad. and $B\pi/2$ rad. of phase $\phi(t)$, and in that interpolation counter 23 is now in the form of a modulo-$(4q+1)$ up/down counter with $(4q+1) = 17$. Counter 23 then acts as an up-counter in the case of curve (1) in response to a sense indication bit $U/D = $ "1", which up-counter starts counting in a counting position 0 and ends in a counting position $(4q-1) = 15$, but acts as a down-counter in the case of curve (2) in response to a sign indication bit $U/D = $ "0", which down-counter starts in a counting position $4q = 16$ and ends in a counting position 1. As the counting position of interpolation counter 23 is used as the second of the read address for read-only memory 26, in both cases the correct sequence of $4q = 16$ signal samples is then read from the sections 26(1) and 26(2).

The arrangement 4 thus obtained has the same advantageous properties as arrangement 4 of FIG. 2, such as, for example, a structure which is attractive for monolithic integration and a large range of data symbol rates $1/T$ which can be processed without any other external circuit setting other than synchronization of clock circuit 20 with the data symbol rate $1/T$, but requires a much smaller memory capacity for read-only memory 26 for a GTFM-signal of the same quality. When this required memory capacity is expressed in the same way as in formula (13) for FIG. 2, then this capacity amounts in general to:

$$2 \times 2^{p-1} \times (4q+1) \times (M-1) \text{ bits} \qquad (19)$$

in which formula the factor 2 represents the two sections 26(1) and 26(2), the factor $2^{p-1}$ represents the number of possible shapes of increasing phase $\phi(t)$ in the first quadrant with a central interval of impulse response $g(t)$ limited to $pT$, the factor $(4q+1)$ represents the number of stored signal samples per symbol period $T$ and the factor $(M-1)$ represents the number of magnitude-bits for quantizing the signal samples (for the sign bit need not be stored as the stored signal samples are now always positive). When the values $p = 5$, $4q = 16$ and $M = 12$ for FIG. 2 are used, the capacity required in read-only memory 26 of FIG. 3 then amounts to only 5984 bits (less than 6K ROM with $1K = 1024$ bits), so that compared with FIG. 2 a reduction by a factor exceeding 8 is accomplished.

The arrangement 4 with the structure shown in FIG. 3 is not limited to the described generation of GTFM-signals, but may alternatively be used for generating signals of different types, such as GSMK-signals and several types of CORPSK and CPM-signals with phase changes per symbol interval equal to $\pm\pi/2$ rad. or multiples thereof. In all these cases the content of first read-only memory 26 must then be adapted to the relevant modulation method, but when the phase changes per symbol interval cannot assume values greater than $\pm\pi/2$ rad., no further changes are necessary; this holds, for example, for GMSK and for the types CORPSK referred to in the publication mentioned in section (A) as CORPSK (2-3, 1+D) and CORPSK (2-3, 1-D$^2$), and of course also for the type referred to as CORPSK (2-5, (1+D)$^2$), which corresponds to TFM. If, however, the phase changes per symbol interval may amount to multiples of $\pm\pi/2$ rad., some changes must indeed be made. This last case will be explained for the CORPSK type which in the above-mentioned publication is referred to as CORPSK (4-5), see the description in paragraph D(4). First, however, a variant of FIG. 3 will be described in which the capacity required for read-only memory 26 is still further reduced.

Figure 8:
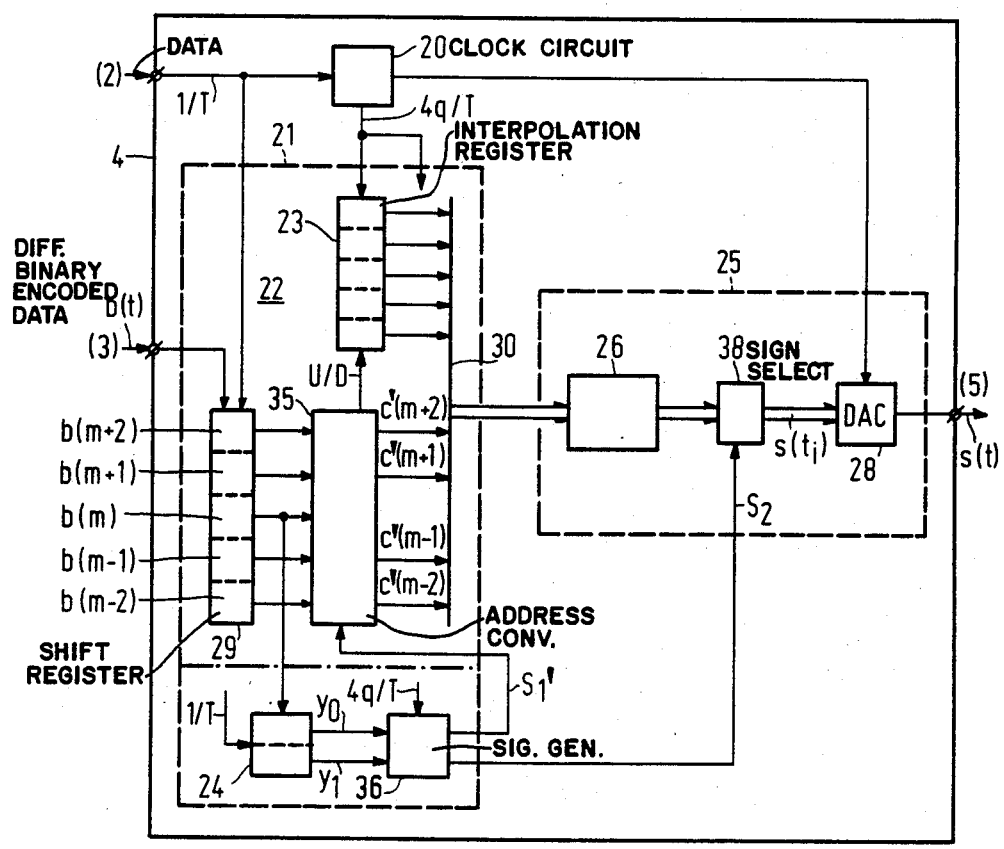
FIG. 8 shows a block diagram of a second embodiment of an arrangement according to the invention for generating a GTFM-signal.

Description of the embodiment in FIG. 8.

FIG. 8 shows a block diagram of a second embodiment of an arrangement 4 according to the invention which in many respects may be considered as a variant of arrangement 4 in FIG. 3. Elements in FIG. 8 corresponding to those in FIG. 3 are given the same reference numerals.

The fundamental difference between FIG. 3 and FIG. 8 is the way in which the signal samples representing $\cos \phi(t)$ and $\sin \phi(t)$ are stored and addressed in first read-only memory 26 to ensure that at each clock instant $t_i$ the correct signal sample $s(t_i)$ in accordance with formulae (11) and (16) is applied to DAC-circuit 28 in response to the first selection signal $S_1$ (of course apart from the sign, as this sign is determined in response to the second selection signal $S_2$). In short, this difference amounts to the fact that in FIG. 3 for each signal sample $s(t_i)$ not only a signal sample of the correct magnitude $|s(t_i)|$ is stored in one of the two sections 26(1) and 26(2) of read-only memory 26, but also a signal sample of an incorrect magnitude in the other section which is not used, as the appropriate section 26(1) or 26(2) is selected by multiplexer 37 in response to selection signal $S_1$. However, in FIG. 8 this signal sample of the incorrect magnitude is not only not used but also not stored in first read-only memory 26. The selection of the appropriate signal sample is effected in FIG. 8, on the one hand, by storing in memory 26 only the values representing the magnitude of $\sin \phi(t)$ for even clock instants $t_i = iT_s$ (i.e. for even values i) and only the values representing the magnitude of $\cos \phi(t)$ for odd clock instants $t_i = iT_s$ (i.e. for odd values i) and, on the other hand, by effecting the address conversion in address converter 35 both in response to the data symbols in shift register 29 and in response to the first selection signal, which in view of its altered role is referred to in FIG. 8 by $S_1$.

The manner in which this address conversion is effected will be described in detail with reference to diagrams a and b of FIG. 9 which in many respects correspond to diagrams a and b of FIG. 4. More specifically, the respective curves (1), (2) and (5), (6) in the first and third quadrants $(0,\pi/2)$ and $(\pi,3\pi/2)$ with numbers $y=0$ and $y=2$ in FIG. 9 correspond to those in FIG. 4. In contrast therewith, in FIG. 9 the respective curves (3'), (4') and (7'), (8') in the second and fourth quadrants $(\pi/2,\pi)$ and $(3\pi/2, 2\pi)$ with numbers $y=1$ and $Y=3$ are mirror-symmetrical with respect to the respective curves (2), (1) and (6), (5) in the first and third quadrants (with $\pi/2$ and $3\pi/2$ as the respective references for the symmetry).

Figure 9:
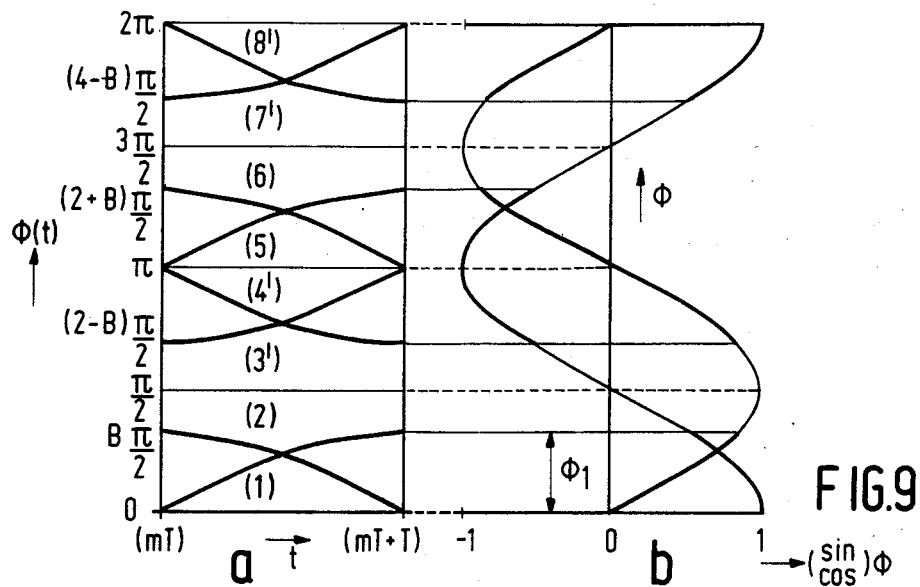
FIG. 9 shows two diagrams to explain the address conversion and the respective selections performed in the arrangement of FIG. 8.

Also in read-only memory 26 of FIG. 8, only the values of the signal samples are stored for the case that phase $\phi(t)$ increases from 0 rad. to $B\pi/2$ rad. in accordance with curve (1) in diagram a of FIG. 9, more specifically the values of sin $[\phi(t_i)]$ for even i and of cos $[\phi(t_i)]$ for odd i, these values again being indicated by sin $\phi_1$ and cos $\phi_1$ and shown in diagram b of FIG. 9 with thick lines in the first quadrant $(0,\pi/2)$ with number y=0. In the same way as Table II was derived from FIG. 4, the following Table V can be derived from FIG. 9 for the relationship between the signal samples sin $[\phi(t_i)]$ and cos $[\phi(t_i)]$ and the now alternately stored signal values sin $\phi$ and cos $\phi_1$.

TABLE V

| y | $y_1y_0$ | sin $\phi(t_i)$ | cos $\phi(t_i)$ |
|---|---|---|---|
| o | oo | sin $\phi_1$ | cos $\phi_1$ |
| 1 | o1 | sin $\phi_1$ | $-$cos $\phi_1$ |
| 2 | 1o | $-$sin $\phi_1$ | $-$cos $\phi_1$ |
| 3 | 11 | $-$sin $\phi_1$ | cos $\phi_1$ |

Also, in this case, the stored signal values sin $\phi_1$ and cos $\phi_1$ can be used for all the curves in FIG. 9. Unlike the case of FIG. 4, in which the sense in which read-only memory 26 is read for decreasing phase $\phi(t)$ is reversed, irrespective of the quadrant, in the case of FIG. 9 the read sense must be reversed for phase $\phi(t)$ decreasing in accordance with curves (2) and (6) in the first and third quadrants with numbers y=0 and y=2 and also for phase $\phi(t)$ increasing in accordance with curves (3') and (7') in the second and fourth quadrants with number y=1 and y=3. Table V shows that the distinction between the first and third quadrants on the one hand and the second and fourth quadrants on the other hand is expressed in the logic value of the least significant bit $y_o$ of the quadrant number y.

Because of this last fact and because of the two types of mirror symmetry in FIG. 9 (with $t=mT+T/2$ and with $\pi/2$, $3\pi/2$ as references) it then follows that for all the curves in FIG. 9 the relationship between the new first part $c'_{m+j}$ and the old first part $b_{m+j}$ with j=-2, -1, 0, 1, 2 of the read address for memory 26 of FIG. 8 is given by the following expression:

$$c'_{m+j} = \overline{y_o}[\overline{b_m}\overline{b}_{m-j} + b_m b_{m+j}] + y_o[\overline{b_m}b_{m+j} + b_m\overline{b}_{m-j}] \quad (20)$$

and that the sense indication bit U/D for interpolation counter 23 of FIG. 8 is given by:

$$U/D = b_m \oplus y_o \quad (21)$$

In the same way as Table IV is derived from Tables II and III, the relationship between the signal samples $s(t_i)$ at instant $t_i = iT_s$ and the signal values sin $\phi_1$ and cos $\phi_1$ stored in memory 26 can be found by combining Tables V and III into Table VI.

TABLE VI

| y | $y_1y_0$ | i mod.4 | $f_{i1}$ | $f_{i2}$ | $s(t_i)$ | $S_1$ | $S_2$ |
|---|---|---|---|---|---|---|---|
| o | oo | o | o | o | sin $\phi$ | o | 1 |
|   |    | 1 | 1 | o | cos $\phi_1$ | o | 1 |
|   |    | 2 | o | 1 | $-$sin $\phi_1$ | o | o |
|   |    | 3 | 1 | 1 | $-$cos $\phi_1$ | o | o |
| 1 | o1 | o | o | o | sin $\phi_1$ | 1 | 1 |
|   |    | 1 | 1 | o | $-$cos $\phi_1$ | 1 | o |
|   |    | 2 | o | 1 | $-$sin $\phi_1$ | 1 | o |
|   |    | 3 | 1 | 1 | cos $\phi_1$ | 1 | 1 |
| 2 | 1o | o | o | o | $-$sin $\phi_1$ | o | o |
|   |    | 1 | 1 | o | $-$cos $\phi_1$ | o | o |
|   |    | 2 | o | 1 | sin $\phi_1$ | o | 1 |
|   |    | 3 | 1 | 1 | cos $\phi_1$ | o | 1 |
| 2 | 11 | o | o | o | $-$sin $\phi_1$ | 1 | o |

TABLE VI-continued

| y | $y_1y_0$ | i mod.4 | $f_{i1}$ | $f_{i2}$ | $s(t_i)$ | $S_1$ | $S_2$ |
|---|---|---|---|---|---|---|---|
|   |    | 1 | 1 | o | cos $\phi_1$ | 1 | 1 |
|   |    | 2 | o | 1 | sin $\phi_1$ | 1 | 1 |
|   |    | 3 | 1 | 1 | $-$cos $\phi_1$ | 1 | o |

The logic signals $f_{i1}$, $f_{i2}$ and $S_2$ of Table VI have the same significance and also the same values as in Table IV. In the selection as effected by multiplexer 37 in signal processor 25 of FIG. 3 in response to the first selection signal $S_1$ in Table IV, both logic signal $f_{i1}$ and the least significant bit $y_o$ of quadrant number y play a role, as is also evident from formula (17). As regards the first selection signal $S'_1$ in Table VI, it can be seen that the role of logic signal $f_{i1}$ is taken over by storing the signal values sin $\phi_1$ and cos $\phi_1$ alternately in read-only memory 26 of signal processor 25 of FIG. 8, so that only the role of the bit $y_o$ of quadrant number y remains in FIG. 8. This remaining role can indeed be performed by the bit $y_o$ itself, in view of its function in formulae (20) and (21) for the logic operations in address converter 35 of FIG. 8, so that for first selection signal $S'_1$ in FIG. 8 and Table VI the following relation holds:

$$S'_1 = y_o \quad (22)$$

and for the second selection signal $S_2$ the relation of formula (18) as derived from Table IV.

On the basis of formulae (22) and (18) the circuit diagram of FIG. 6 can also be applied to realize selection signal generator 36 of FIG. 8, when EX-OR gate 45 in this circuit diagram is not utilized and bit $y_o$ is directly used as the selection signal $S'_1$ (dot-and-dash line in FIG. 6).

Figure 10:
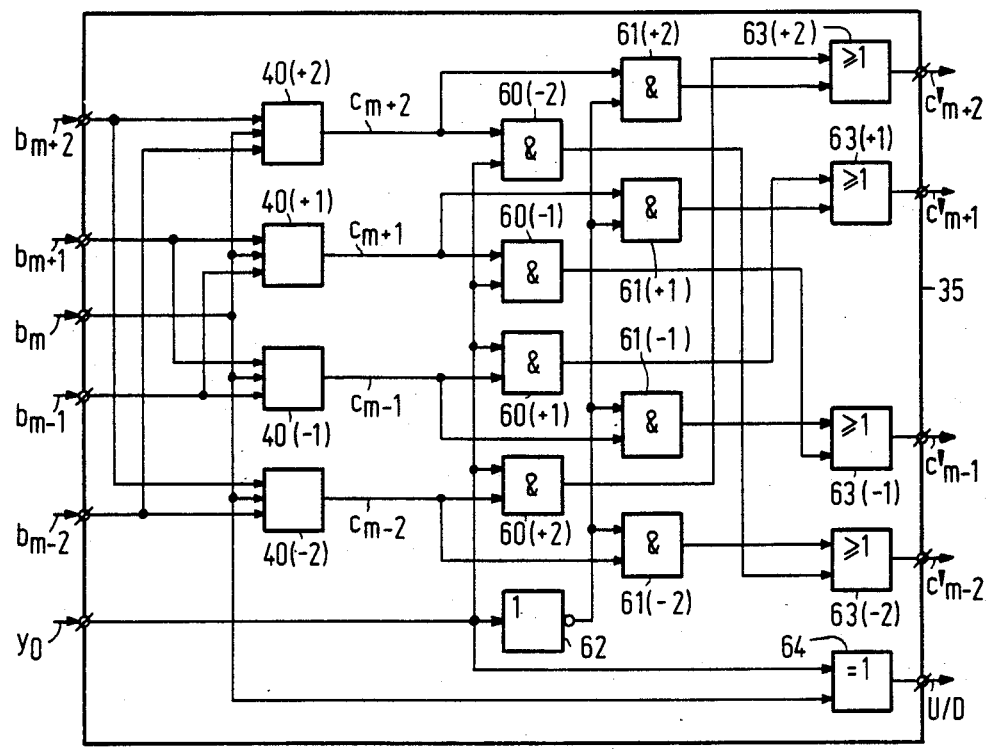
FIG. 10 shows a block diagram of an embodiment of an address converter suitable for use in the arrangement of FIG. 8.

On the basis of formulae (20) and (21) it then follows that address converter 35 of FIG. 8 can be realized as a logic circuit in accordance with the circuit diagram of FIG. 10. In this circuit diagram, use is made of the fact that formula (20) can be written as:

$$c'_{m+j} = \overline{y_o}c_{m+j} + y_o c_{m-j}(j=\pm 1, \pm 2) \quad (23)$$

where $c_{m+j}$ is defined by formula (14). Address converter 35 of FIG. 10 consequently also comprises four subcircuits 40(j) in accordance with the circuit diagram of FIG. 5 for forming the bits $c_{m+j}$ where $j\neq 0$ (for j=0 it follows that $c'_{m+j} = c_m = $"1"). In addition, FIG. 10 comprises four AND-gates 60(j) and four AND-gates 61(j) for forming the respective terms $y_o c_{m-j}$ and $\overline{y_o}c_{m+j}$ in formula (23) in response to the bit $y_o$ and the bit $\overline{y_o}$ obtained with the aid of a NOT-gate 62. The bits $c'_{m+j}$ in accordance with formula (23) are then formed with the aid of four OR-gates 63(j) and the bit U/D in accordance with formula (21) is then formed with the aid of an EX-OR-gate 64. In addition to said 14 logic gates, address converter 35 of FIG. 10 comprises four subcircuits 40(j) each comprising 3 logic gates (see FIG. 5), a total of 26 logic gates.

Compared to FIG. 3, arrangement 4 for FIG. 8 has the advantage that the required storage capacity of read-only memory 26 is halved by the described way of alternately storing the signal values sin $\phi(t_i)$ and cos $\phi(t_i)$ for an even i and odd i, respectively. In FIG. 8 this required storage capacity then amounts to:

$$2^{p-1} \times (4q+1) \times (M-1) \text{ bits} \quad (24)$$

which formula (24) is derived in the same way as the respective formulae (13) and (19) for FIG. 2 and FIG. 3. With the values p=5, 4q=16 and M=12 already mentioned for FIG. 2, the capacity required in read-only memory 26 of FIG. 8 then amounts to 2992 bits (less than 3K ROM with 1K=1024 bits), so that compared to FIG. 2 a reduction by a factor greater than 16 has been accomplished.

The remarks in the last paragraph of the previous section D(2) on adaptation to modulation methods different from GTFM by changing the contents of read-only memory 26, also hold for arrangement 4 having the structure as shown in FIG. 8, with the restriction, however, that with these other modulation methods the phase changes per symbol interval may not assume higher values than $\pm\pi/2$ rad. This last restriction does not hold for the structure of FIG. 3.

The fact that in read-only memories 26 of FIG. 3. and FIG. 8, $(4q+1)=17$ signal samples now are stored for each of the $2^{p-1}=16$ possible shapes of increasing phase $\phi(t)$ in the first quadrant $(0, \pi/2)$, results in a second part of the read address (counting position of interpolation counter 23) having a width of 5 bits instead of 4 bits, as required for the storage of $4q=16$ signal samples in read-only memory 26 of FIG. 2. In view of the customary implementation of read-only memories this manner of storage is little efficient.

Figure 11:
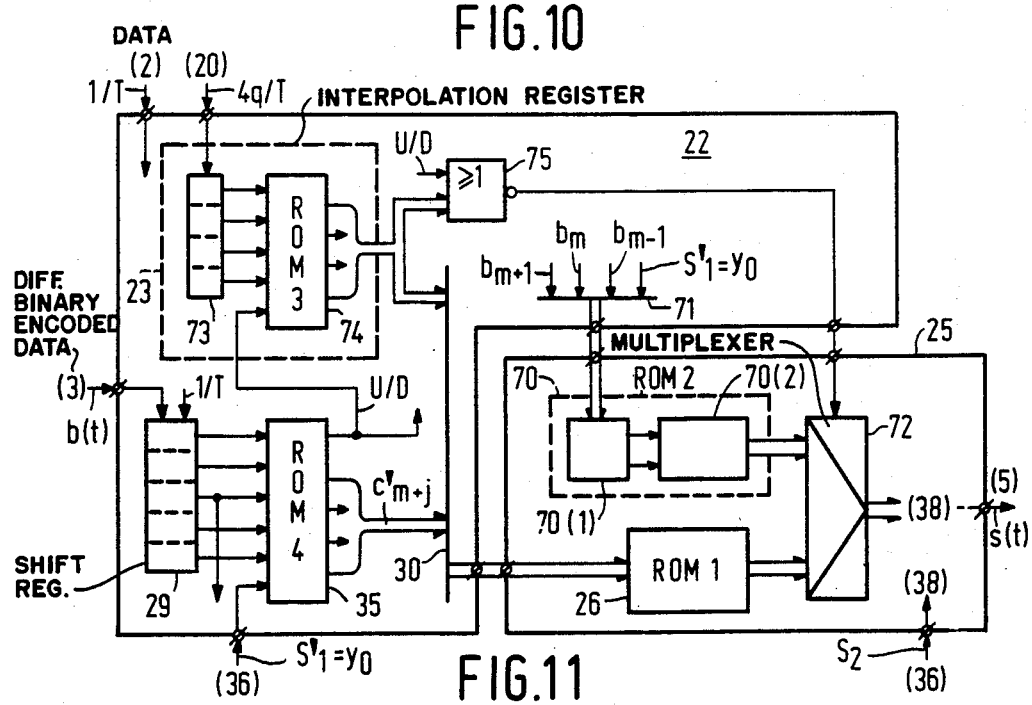
FIG. 11 shows a block diagram of a variant of the addressing circuit and the signal processor of FIG. 8.

A possibility to make a more efficient use of read-only memories of customary implementation is given in the block diagram of FIG. 11. This diagram is a variant of signal processor 25 and addressing circuit 22 of FIG. 8, in which not only for the storage of signal samples, but also for providing the interpolation counter 23 and address converter 35 use is made of read-only memories in view of their simple programming for performing given functions, which programming is much simpler in practice than disigning and implementing logic circuits for the same functions.

In read-only memory 26 of FIG. 11 there are stored $4q=16$ signal samples for each of the $2^{p-1}=16$ possible shapes of increasing phase $\phi(t)$ in quadrant $(0, \pi/2)$, for which 16 samples the counting positions 0 up to and including $(4q-1)=15$ of interpolation counter 23 form the second part of the read address in the case of a sense indication bit $U/D=$"1". The additional signal samples for the value of $\phi(t)$ at the final instant $t=mT+T$ of a symbol interval (mT, mT+T), for which in FIG. 3 and FIG. 8 the counting position $4q=16$ of interpolation counter 23 forms the second part of the read address in the case of a sense indication bit $U/D=$"0", is not stored in FIG. 11 in first read-only memory 26, but in a separate, second, read-only memory 70. The value p=5 then generally requires $2^{p-1}=16$ additional signal samples, but for the case of GTFM-signals it has been found that these additional samples can only assume 4 different values. In FIG. 11 this fact is utilized in that second read-only memory 70 is divided into two small read-only memories 70(1) and 70(2), the 4 different values of the additional signal samples being stored in read-only memory 70(2) and the 2-bit wide addresses for read-only memory 70(2) being stored in read-only memory 70(1) in 16 locations. The address for these 16 locations of read-only memory 70(1) is formed in addressing circuit 22 of FIG. 11 by means of an address bus 71, to which the 3 bits $b_{m-1}, b_m, b_{m+1}$ of shift register 29 and the bit $y_o$ of first selection signal $S_1^1=y_o$ of generator 36 are applied. On the basis of formula (2), these 3 bits $b_{m-1}, b_m, b_{m+1}$ determine the final value of phase $\phi(t)$ in each phase quadrant and from diagram a of FIG. 9 it follows that the least significant bit $y_o$ of quadrant number y is sufficient to determine which of these final values must be used in the relevant phase quadrant. The first and second read-only memories 26 and 70 are connected to a 2-input multiplexer 72 for conveying at each clock instant $t_i=iT_s$ the appropriate signal sample for further processing which is effected in FIG. 11 similarly as in FIG. 8. The control signal for multiplexer 72 is derived from interpolation counter 23 in addressing circuit 22 of FIG. 11.

In FIG. 3 and FIG. 8 interpolation counter 23 is realized as a modulo-17 up/down counter which in response to a bit $U/D=$"1" counts up from an initial position 0 to a final position 15 and in response to a bit $U/D=$"0" counts down from an initial position 16 to a final position 1, the second part of the read address for first read-only memory 26 having a width of 5 bits. In FIG. 11 this second part has a width of only 4 bits because of the modified manner of storing the signal samples in first read-only memory 26. Interpolation counter 23 in FIG. 11 is now constituted by a simple modulo-16 counter 73, whose counting position (4 bits) together with the bit U/D of address converter 35 forms the address for a third 32-location read-only memory in which the 4-bit wide second part of the read address for first read-only memory 26 is stored. This second part corresponds to the binary representation of the values modulo-16 of the counting positions of interpolation counter 23 in FIG. 3 and FIG. 8, which means that for a bit $U/D=$"0" these values pass through the sequence 0,15,14 . . . , 3,2,1. The control signal for multiplexer 72 in FIG. 11 is then obtained with the aid of a NOR-gate 75, which receives the 4 output bits of third read-only memory 74 and the bit U/D of address converter 35. Only with a logic value "1" of the output signal of NOR-gate 75 does the multiplexer 72 convey the signal sample of second read-only memory 70 (so this only occurs at a counting position 16 in FIG. 3 and FIG. 8 together with a bit $U/D=$"0").

Further, in FIG. 11 address converter 35 is also constituted by a read-only memory having 64 locations, in which the 4 bits $c'_{m+j}$ and the bit U/D of FIG. 10 are stored and for which the 5 bits $b_{m+j}$ and the bit $y_o$ of FIG. 10 form the address.

On using the values p=5, $4q=16=2^4$ and M=12, mentioned several times already in the foregoing, FIG. 11 requires in signal processor 25 a storage capacity of 2892 bits for storing signal samples, which capacity is distributed as follows over first read-only memory 26 (ROM1) and second read-only memory 70 (ROM2):

| | | | |
|---|---|---|---|
| ROM 1 | $2^4 \times 2^4 \times 11$ | = | 2816 bits |
| ROM 2 | $(2^4 \times 2) + (2^2 \times 11)$ | = | 76 bits + |
| | | | 2892 bits |

In addressing circuit 22 of FIG. 11, a storage capacity of 448 bits is required, which capacity is distributed as follows over third read-only memory 74 (ROM3) in interpolation counter 23 and a fourth read-only memory (ROM4) forming address converter 35:

| | | | |
|---|---|---|---|
| ROM 3 | $2^5 \times 4$ | = | 128 bits |
| ROM 4 | $2^6 \times 5$ | = | 320 bits + |
| | | | 448 bits |

When FIG. 11 is compared with FIG. 8, the last-mentioned storage capacity may be left out of account since in FIG. 8 use can alternatively be made of an addressing circuit 22 as shown in FIG. 11, but slightly modified (address bus 71 is omitted, and the output of NOR-gate 75 is connected to address bus 30).

The difference between FIGS. 11 and 8 does not so much reside in the storage capacity required for storing 11-bit signal samples in the storage location of first read-only memory 26 (2816 bits in FIG. 11 and 2992 bits in FIG. 8), but rather in the fact that the address for the storage locations in FIG. 11 has a width of $(4+4)=8$ bits and in FIG. 8 a width of $(4+5)=9$ bits. As regards FIG. 8, the internal structure of the read-only memory is consequently based on a number of $2^9=512$ storage locations, of which only $2^4\times(2^4+1)=2^4\times 272$ storage locations are required for storing signal samples and consequently 240 storage locations are not implemented, while for FIG. 11 the internal structure of the read store is based on a number of $2^8=256$ storage locations which are all required for storing signal samples and are consequently all implemented. Thus, FIG. 11 utilizes the customary implementation of read-only memories much more efficiently than FIG. 8.

Description of the embodiment of FIG. 12

FIG. 12 shows a block diagram of a third embodiment of an arrangement according to the invention, more specifically of an arrangement 4 for generating a type of CORPSK-signals, referred to as CORPSK (4–5) in the publication mentioned in section (A) and which is extensively described in U.S. Pat. No. 4,320,499. As the structure of arrangement 4 in FIG. 12 largely corresponds to that of arrangement 4 in FIG. 3, the description of FIG. 12 will predominantly deal with the modifications of respect to FIG. 3.

CORPSK (4–5) is a modulation method in which 4-level data symbols $a(m)$ modulate the phase of a carrier signal so that its phase $\phi(t)$ in time interval $(mT, mT+T)$ changes by an amount $\Delta\phi(m)$ defined by:

$$\Delta\phi(m)=\phi(mT+T)-\phi(mT)=k(m)\pi/2 \quad (25)$$

where $k(m)$ is a 5-level data symbol, whose level may assume a value in the range $-2, -1, 0, 1, 2$. Between the phase change $\Delta\phi(m)$ and the level of data symbol $a(m)$ which can assume a value in the range 0, 1, 2, 3, there is the relationship according to the following Table VIII; this Table also contains a binary encoding of the levels of $a(m)$ with 2 bits $a_{1m}$, $a_{0m}$ and of the levels of $k(m)$ with 3 bits $h_m$, $a_{1m}$, $a_{0m}$, which encoding is chosen such that an error in one of the bits $a_{1m}$, $a_{0m}$ results in an error of not more than $\pi/2$ rad.in $\Delta\phi/(m)$.

TABLE VII

| a(m) | $a_{1m}$ | $a_{0m}$ | k(m) | $h_m$ | $a_{1m}$ | $a_{0m}$ | $\Delta\phi(m)$ |
|---|---|---|---|---|---|---|---|
| 1 | 1 | 0 | −1 | 0 | 1 | 0 | $-\pi/2$ |
| 2 | 0 | 0 | 0 | 0 | 0 | 0 | 0 |
| 3 | 0 | 1 | +1 | 0 | 0 | 1 | $+\pi/2$ |
| 0 | 1 | 1 | +2 | 0 | 1 | 1 | $+\pi$ |
| 0 | 1 | 1 | −2 | 1 | 1 | 1 | $-\pi$ |

The bit $h_m$ indicates whether the value $k(m)=+2$ or $k(m)=-2$ has been chosen for $a(m)=0$. This choice is determined by preceding values $\phi(m-1)$ and $\phi(m-2)$, and thus by the values $k(m-1)$ and $k(m-2)$, in accordance with the following Table VIII.

TABLE VIII

| a(m) = 0 | | k(m) | $h_m$ | $\Delta\phi(m)$ |
|---|---|---|---|---|
| k(m − 1) − k(m − 2) | > 0 | +2 | 0 | $+\pi$ |
| | = 0, k(m − 1) > 0 | +2 | 0 | $+\pi$ |
| | > 0 | −2 | 1 | $-\pi$ |
| | = 0, k(m − 1) < 0 | −2 | 1 | $-\pi$ |
| | < 0 | −2 | 1 | $-\pi$ |
| k(m − 1) = k(m − 2) = 0 | | +2 | 0 | $+\pi$ |

For the case in which $k(m-1)=k(m-2)=0$, the choice of $k(m)$ for $a(m)=0$ might be determined by still earlier values $k(m-3)$, $k(m-4)$, .... As it has been found that such an extension provides hardly any advantages, a fixed choice has been made in accordance with the last line of Table VIII. For further particulars, reference is made to the above-mentioned U.S. Pat. No. 4,320,419, in which Tables 1 and 2 correspond to the above Tables VII and VIII. From these Tables and from formula (25) the most important differences between CORPSK (r−5) and GTFM, as regards signal generation, will become apparent.

In the first place the phase $\phi(t)$ of the CORPSK (4–5) signal in a symbol interval of length T may change by an amount of $\pm\pi$ rad., so that within this time interval the value modulo-$2\pi$ of phase $\phi(t)$ does not always remain in the same phase quadrant $[y\pi/2, (y+1)\pi/2]$ with $y=0, 1, 2$ or 3 at an appropriate choice of phase $\phi(t)$ at a reference instant $t=0$ and, consequently, the transition to a different phase quadrant may also occur at instants other than at the boundaries of the symbol intervals. To characterize the values modulo-$2\pi$ of phase $\phi(t)$ at the boundaries of symbol interval $(mT, mT+T)$, use can no longer be made of one quadrant number $y(m)$ modulo-4, as for a GTFM-signal, but use is now made of a phase state number $z(n)$ modulo-4 which characterizes the value modulo-$2\pi$ of phase $\phi(t)$ at the initial instant $t=mT$ of this symbol interval for an appropriate choice of $\phi(t)$ at reference instant $t=0$. For a choice $\phi(0)=0$ then the relation holds:

$$\phi(mT)=[z(m)\cdot\pi/2]\text{modulo } 2\pi \quad (26)$$

From formula (25) it then follows that phase state number $z(n)$ modulo-4 is defined by:

$$z(m)=[z(m-1)+k(m-1)]\text{modulo-4} \quad (27)$$

This phase state number $z(m)$ can then be obtained as the counting position of a modified modulo-4 up/down counter, to which the data symbol $K(m-1)$ is applied and whose counting position $z(m)$ is related to the previous counting position $z(m-1)$ in accordance with formula (27). As $k(m-1)=+2$ and $k(m-1)=-2$ result in the same number $z(m)$, phase state number $z(m)$ can be derived directly from data symbol $a(m-1)$, as will also be evident from Table VII (with the chosen binary encoding, the 3 bits of $k(m-1)$ are obtained by joining bit $h_{m-1}$ to the 2 bits of $a(m-1)$, but in forming number $z(m)$ this bit $h_{m-1}$ plays no role. In FIG. 12 this last possibility is utilized for controlling phase state counter 24, the encoding of phase state number z with 2 bits $z_1$, $z_0$ being effected in the same way as the alredy mentioned encoding of quadrant number y with 2 bits $y_1$, $y_0$ (cf. Table II).

In the second place, Table VIII shows that the choice between the values $k(m)=+2$ and $k(m)=-2$ depends on the history of data signal a(t) prior to the instant t=mT and that the correlatively encoded data symbols k(m) are derived from the data symbols a(m) in accordance with a non-linear prescription. This can be effected by applying data symbol a(m) to a non-linear code converter, which determines the value k(m) in response to data symbol a(m) and the two preceding values k(m−1) and k(m−2) and which is described in greater detail in the above-mentioned U.S. Pat. No. 4,320,499 (see FIG. 10). For the binary encoding chosen, the 3 bits of k(m) being obtained by joining a bit $h_m$ to the 2 bits of a(m), it is alternatively sufficient to determine this bit $h_m$ in response to the 2 bits of each of the data symbols a(m), a(m−1) and a(m−2) and the preceding bits $h_{m-1}$ and $h_{m-2}$. In FIG. 12 use is made of this last feature by incorporating in address circuit 22 a non-linear correlative encoding circuit 80 which receives the 3 most recent symbols of the set of data symbols {a} in shift register 29 through an address bus 81 for producing the set of bits {h} corresponding to this set {a}.

So as to avoid a further complication of the description, it is assumed in FIG. 12 that the central interval of the pulse response is limited to a length pT=3T, so that the set a only contains the 3 data symbols a(m+1), a(m) and a(m−1). Encoding circuit 80 can then be realized in accordance with the circuit diagram in FIGS. 13a or 13b, the circuit diagram if FIG. 13a having the same structure as the circuit diagram of FIG. 10 of the above-mentioned U.S. Pat. No. 4,320,499.

In diagram a of FIG. 13, encoding circuit 80 comprises a read-only memory 82 in which the possible values of the bit $h_{m+1}$ are stored. An address having a width of 8 bits is applied to read-only memory 82 through an address 83, which address, in view of the foregoing, must be composed of the 2 bits of each of the data symbols a(m+1), a(m), a(m−1) and the 2 preceding bits $h_m$ and $h_{m-1}$. These bits $h_m$ and $h_{m-1}$ are obtained by connecting a shift register 84, which in this case needs only to comprise 2 elements to the output of read-only memory 82. For a set {a} having more than 3 data symbols, shift register 84 has a correspondingly larger number of elements for the set {h}, no further modifications in the structure of encoding circuit 80 being, however, necessary. From Tables VII and VIII it can be derived in a simple way which values of bit $h_{m+1}$ must be stored in the locations of read-only memory 82. This read-only memory 82 has a capacity of $2^8 \times 1 = 256$ bits in diagram a, but in diagram b a capacity of $2^6 \times 1 = 64$ bits is sufficient, by utilizing the fact that the bit $h_{m+1}$ is only of significance for data symbols a(m+1)=0 and for data symbols a(m+1)≠0 always has the logic value "0". Therefore, in diagram b the 2 bits of data symbol a(m+1) are not applied to address bus 83, but to an AND-gate 85 which controls an AND-gate 86 connected to the output of read-only memory 82, so that only for a(m+1)=0 a bit $h_{m+1}$ having a logic value different from "0" can be conveyed.

In accordance with Table VII, the value p=3 results in principle in $5^3 = 125$ different combinations k(m−1), k(m), k(m+1) and consequently in 125 different shapes of phase φ(t) in a symbol interval (mT,mT+T) for each of the 4 possible initial phase φ(mT) modulo-2π with phase state number z(m), In accordance with Table VIII, 33 of the 125 combinations are, however, cancelled, so that for each phase state number z(m) only 92 different shapes of phase φ(t) are possible. These 92 shapes can be divided into two groups, more specifically a group G(−) for values of phase φ(t) which decrease relative to initial phase φ(mT) and a group G(+) for values of phase φ(t) which do not decrease relative to initial phase φ(mT). So as to keep the further description of FIG. 12 as simple as possible, it as assumed that the 20 possible shapes of phase φ(t) for combinations k(m−1), k(m), k(m+1) with k(m)=0, are not distributed over both groups G(+) and G(−), but that they belong in their entirely to group G(+), so that group G(+) comprises the 56 combinations with k(m)=0, k(m)=+1 and k(m)=+2 and group G(−) comprises the 36 combinations with k(m)=−1 and k(m)=−2.

In a similar way as in FIG. 3, first read-only memory 26 in FIG. 12 is arranged for storing only signal samples cos [φ($t_i$)] in section 26(1) and sin [φ($t_i$)] in section 26(2) for values of phase φ(t) which do not decrease relative to an initial phase φ(mT)=0 modulo-2π having phase state number z(m)=0, thus for group G(+) with z(m)=0.

Likewise, in a similar way as in FIG. 3, address converter 35 produces in FIG. 12 a new first part {k'} of the read addresses for memory 26 in response to the set of data symbols {k} formed by the combination of data symbols {a} on address bus 81 with the set of bits {h} at the output of encoding circuit 80. For group G(+) no address conversion need be effected, so that then {k'}={k}. For group G(−) the address conversion means that the polarity of the value of each of the data symbols of the set {k} is inverted. Table VII shows that with the binary encoding of k(m) opted for, the polarity inversion of the value of k(m) can be effected by always interchanging the position of the 2 bits $a_{1m}$, $a_{0m}$ of a(m), resulting in $a_{0m}$, $a_{1m}$ and to additionally complement the bit $h_m$ only for a(m)=0, thus for |k(m)|=2, resulting in $\bar{h}_m$, $a_{1m}$.

A difference compared with FIG. 3 is that address converter 35 of FIG. 12 now produces as a conversion indication signal a polarity indication bit P, a logic value P="1" indicating that no polarity inversion occurs, but no sense indication bit U/D for interpolation counter 23 as in FIG. 3. Consequently, interpolation counter 23 of FIG. 12 has the form of a simple modulo-16 counter. For the binary encoding of k(m) opted for and for the chosen division into groups G(+) and G(−), polarity inversion only occurs for k(m)=−1 and k(m)=−2. Table VII shows that the case k(m)=−1 is unambiguously characterized by the occurrence of the 2 bits $a_{1m}$, $a_{0m}$ having logic values $a_{1m}$="1" and $a_{0m}$="0" for a(m)=1 and the case k(m)=−2 by the occurrence of the bit $h_m$ having logic value $h_m$="1". Based thereon, the following logic relationship holds for polarity indication bit P:

$$P = (\bar{a}_{1m} + a_{0m})\bar{h}_m \quad (25)$$

If address converter 35 is implemented as a logic circuit, this bit P can also be used for the address conversion itself, as on the strength of the above considerations the following logic relations exist between the bits h', $a_1$, $a_0$ of each of the symbols of set {k} and the bits h, $a_1$, $a_0'$ of the corresponding symbol of the set {k'}:

$$a_1' = P a_1 + \bar{P} a_0 \quad (26)$$

$$a_0' = P a_0 + \bar{P} a_1$$

-continued $$h' = h + \overline{P} a_1 a_0$$

where + indicates the modulo-2 addition. If the bits $h'_i$, $a_1'$, $a_0'$ thus obtained for each of the three data symbols $k(m-1)$, $k(m)$, $k(m+1)$ were directly used as the new first part of the read address for read-only memory 26, this new first part should have a width of 9 bits. To distinguish the 56 combinations of group $G(+)$, a new first part having a width of 6 bits is however sufficient ($56<64=2^6$), so that in such a logic circuit, in addition to gates for effecting the logic operations of formulae (25) and (26), a further large number of gates is also necessary to obtain the ultimate new first part with the desired width of 6 bits. Therefore, realizing address converter 35 as a read-only memory is to be preferred from the point of view of simplicity in structure and programming.

Figure 14:
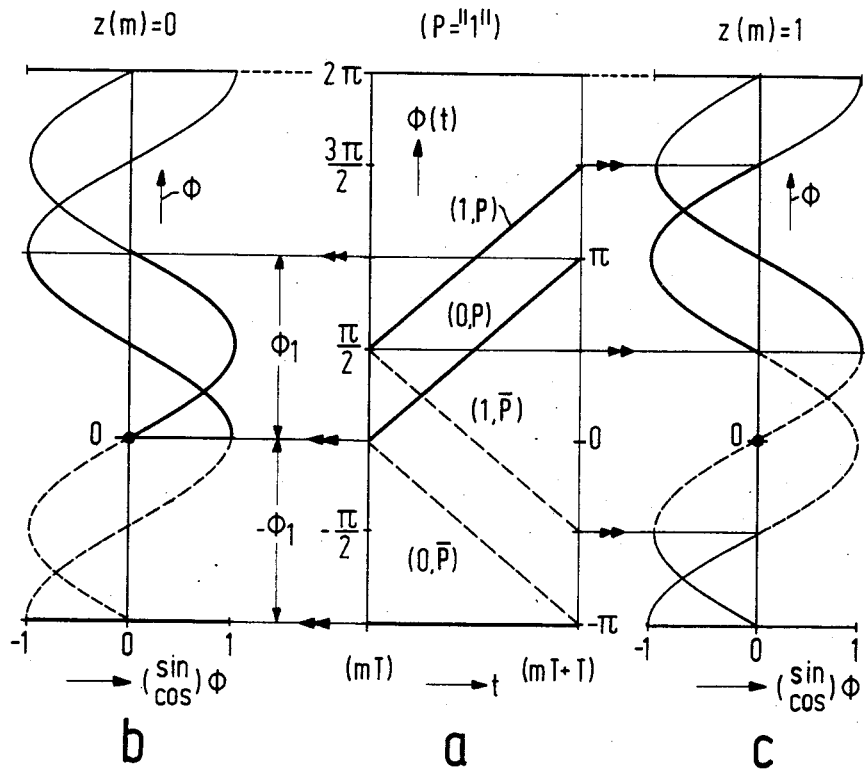
FIG. 14 shows two diagrams to explain the respective selections performed in the arrangement of FIG. 12.

In FIG. 12 the polarity indication bit P produced by address converter 35 is applied to generator 36 and used therein for generating the two selection signals $S_1$ and $S_2'$. The way in which this is effected will now be described in detail with reference to the diagrams of FIG. 14 which in many respects correspond to the diagrams of FIG. 4. In a similar way as in diagram a of FIG. 4, diagram a of FIG. 14 shows examples of possible changes of phase $\phi(t)$ within a symbol interval (mT, mT+T), the value of the phase change $|\Delta\phi(m)|=\pi$rad. being chosen. The curves in diagram a are denoted by (z, P) or (z, $\overline{P}$), where $z=z(m)$ is the phase state number for the initial phase $\phi(mT)$ and P the polarity indication bit P of address converter 35 having logic value "1". All the curves in diagram a have identical shapes and curves $(0, \overline{P})$, $(1, \overline{P})$ are mirror-symmetrical to curves $(0, P)$, $(1, P)$ with respect to the references 0 and $\pi/2$, respectively. Also in the same way as in diagram b of FIG. 4, the shapes of $\cos \phi$ and $\sin \phi$ are plotted in diagrams b and c along the horizontal axis as a function of $\phi$ along the vertical axis on the same scale as for $\phi(t)$ in diagram a, diagram b being associated with $z(m)=0$ and diagram c with $z(m)=1$.

Also in sections 26(1) and 26(2) of read-only memory 26 in FIG. 12, only the values of the signal samples $\cos[\phi(t_i)]$ and $\sin[\phi(t_i)]$ are stored for the case in which phase $\phi(t)$ increases from 0 rad to $\pi$ rad in accordance with curve (0, P) in diagram a of FIG. 14, these stored values again being denoted by $\cos \phi_1$ and $\sin \phi_1$ and represented by thick lines in diagram b of FIG. 14. This increasing phase $\phi(t)$ now has a range $\phi_1$ of $\pi$ rad., instead of $\pi/2$ rad. as in FIG. 4, and consequently now also the sign of $\cos \phi_1$ and $\sin \phi_1$ is stored in read-only memory 26.

Diagram c of FIG. 14 shows that the stored values $\cos \phi_1$ and $\sin \phi_1$ can be used for curve (1,P) with phase state number $z(m)=1$. This also holds for curves (2, P) and (3, P) having phase state numbers $z(m)=2$ and 3, which are not shown in diagram a, as can be easily checked by drawing for these curves diagrams comparable to diagrams b and c. It then appears that for curves (z, P) with $z=0, 1, 2$ and 3, there exists the same relation as in Table II between the signal samples $\cos[\phi(t_i)]$ and $\sin[\phi(t_i)]$ and the stored sequences of signal values $\cos \phi_1$ and $\sin \phi_1$, when in this Table quadrant number y with bits $y_1y_0$ is replaced by phase state number z with bits $z_1z_0$.

If in read-only memory 26 only the sequences of signal values $\cos(-\phi_1)$ and $\sin(-\phi_1)$ were stored for curve $(0, \overline{P})$ in diagram a, which values are shown in diagram b by means of broken lines, then it follows from the above description that for the curves (z, $\overline{P}$) with $z=0, 1, 2$ and 3 the same relation also exists between the signal samples $\cos[\phi(t_i)]$ and $\sin[\phi(t_i)]$ and the values $\cos(-\phi_1)$ and $\sin(-\phi_1)$ then stored, as in Table II (evidently with y replaced by z). The relationship with the actually stored values $\cos \phi_1$ and $\sin \phi_1$ can then be obtained in a simple way by utilizing the known relations:

$$\cos(-\phi_1)=\cos \phi_1$$

$$\sin(-\phi_1)=-\sin \phi_1 \quad (27)$$

which also directly follow from diagram b, more specifically by always introducing an additional sign inversion in Table II when the stored signal value $\sin \phi_1$ is used therein.

In the same way as Table IV is derived by combining Tables II and III, the Tables thus obtained for P and $\overline{P}$ can be combined with Table III. For P this results in the same Table as Table IV (of course, by substituting z for y) and consequently also in the same selection signals $S_1$ and $S_2$ as in FIG. 3. The resultant Table for $\overline{P}$ is obtained by always effecting, also in Table IV, an additional sign inversion when the stored signal value $\sin \phi_1$ is used therein and consequently—in view of the definition of first selection signal $S_1$—when the logic value $S_1$="0" occurs. This results for $\overline{P}$ in the same first selection signal $S_1$ as in FIG. 3, and also in a second selection signal which (for $\overline{P}$) is formed from the second selection signal $S_2$ in FIG. 3 by effecting an additional sign inversion at a logic value $S_1$="0".

Figure 15:
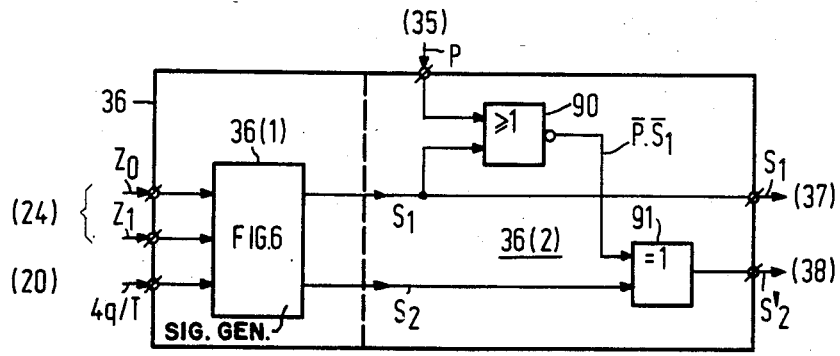
FIG. 15 shows a block diagram of an embodiment of a selection signal generator suitable for use in the arrangement of FIG. 12.

On the basis of these facts, selection signal generator 36 in FIG. 12 can be realized in accordance with the circuit diagram of FIG. 15. This generator 36 comprises a section 36(1) for producing selection signals $S_1$ and $S_2$ as defined in formulae (17) and (18) which can be formed in the same way as selection signal generator 36 in FIG. 6 (but of course by substituting $z_1$, $z_0$ for $y_1$, $y_0$), and a section 36(2) for producing a second selection signal $S_2'$ for sign inverter 38, where $S_2'=\overline{S_2}$, when both P and $S_1$ have a logic value "0", and where $S_2'=S_2$ in all the other cases. To that end, section 36(2) comprises a NOR-gate 90 for forming a logic signal $\overline{P} \cdot \overline{S_1}$ in response to polarity indication bit P of address converter 35 and a first selection signal $S_1$ of section 36(1) and furthermore an EX-OR-gate 91 for forming a second selection signal $S_2'$ in response to a second selection signal $S_2$ of section 36(1) and logic signal $\overline{P} \cdot \overline{S_1}$ of NOR-gate 90.

What is claimed is:

1. An apparatus for generating an angle modulated carrier having a constant amplitude and continuous phase $\phi(t)$ with data signals of a given symbol frequency 1/T comprising:
   (a) a clock circuit synchronized with the symbol frequency which produces a clock signal having a frequency 4q/T, where q is an integer greater than 1;
   (b) a control circuit comprising:
      (i) an addressing circuit controlled by said clock signal, said addressing circuit comprising:
         (A) an interpolation counter responsive to a given number of consecutive data symbols producing addresses at a frequency of 4q/T;
         (B) a counter controlled by a signal having the symbol frequency, responsive to the data symbols for producing phase state numbers representing the phase $\phi(t)$ in modulo $2\pi$ values at the boundaries of the symbol intervals of length T; and (C) and address converter circuit responsive to said given number of consecutive data symbols for producing addresses and for producing a conversion indication signal for said interpolation counter;

(ii) a selection signal generator controlled by the clock signal and responsive to the phase state numbers for producing first and second selection signals;

(c) a signal processor connected to the control circuit counters, said first selection signal enabling at each clock instant said signal processor to generate one of said two values representing the signals cos $\phi(t)$ and sin $\phi(t)$, said signal processor including a first read only memory addressable by addresses received from said address converter, said first read only memory being for storing only the values representing cos $\phi(t)$ and sin $\phi(t)$ for non-decreasing phases $\phi(t)$ associated with one predetermined number;

(d) a digital to analog converter connected to receive said first read only memory addressed contents, said digital to analog converter producing an inverted and non-inverted analog signal in response to said second selection signal, whereby said read only memory signals are converted into samples of a modulated carrier at a carrier frequency of q/T.

2. An apparatus as claimed in claim 1, wherein the first read-only memory in the signal processor comprises a first section for values representing the signal cos $\phi(t)$ and a second section for values representing the signal sin $\phi(t)$; and the signal processor includes a 2-input multiplexer connected to the first and second sections of the read-only memory and controlled by the first selection signal, and a sign inverter controlled by the second selection signal serially connected together with the digital-to-analog converter and the multiplexer.

3. An apparatus as claimed in claim 2, wherein the sign inverter is a polarity inverter connected to the output of the digital-to-analog converter, the polarity inverter comprising an amplifier having an inverting and a non-inverting input and a 2-position switch for selectively connecting the output of the digital-to-analog converter to one of the two inputs of the amplifier in response to the second selection signal.

4. An apparatus as claimed in claim 2 for generating angle-modulated carrier signals, in which the change of the phase $\phi(t)$ per symbol interval of length T is not more than $\pm\pi/2$ rad. and the phase $\phi(t)$ within a symbol interval always remains in the same phase quadrant $[y\pi/2, (y+1)\pi/2]$ with quadrant number y, and wherein the first read-only memory in the signal processor stores the values representing the magnitude of signals $\phi(t)$ and sin $\phi(t)$ for non-decreasing phases $\phi(t)$ in the first phase quadrant $(0, \pi/2)$ with quadrant number y=0;

the counter for producing phase state numbers is a modulo-4 up/down counter whose counting position represents the quadrant number y modulo-4 of phase $\phi(t)$ for each symbol interval with 2 bits $y_1 y_0$; and the interpolation counter is a modulo-(4q+1) up/down counter whose counting sense is controlled by a conversion-indication signal of the address converter.

5. An apparatus as claimed in claim 2 for generating angle-modulated carrier signals, in which the change of the phase $\phi(t)$ per symbol interval of length T amounts to 0 rad, $\pm\phi/2$ rad. or integral multiples thereof, and the phase $\phi(t)$ of the beginning of symbol interval always has a value of z $(\pi/2)$ with state number z, wherein the first read-only memory in the signal processor stores values representing signals cos $\phi(t)$ and sin $\phi(t)$ for values of phases $\phi(t)$ which are non-decreasing relative to an initial phase $\phi(t)=0$ rad. with state number z=0;

the counter for producing phase state numbers is a modulo-4 up/down counter whose counting position represents the phase state number z modulo-4 of phase $\phi(t)$ at the beginning of each symbol interval with 2 bits $z_1 z_0$; and the selection signal generator is responsive to the 2 bits $z_1 z_0$ of phase state number z modulo-4 for producing the first selection signal and to be responsive to said 2 bits $z_1 z_0$ and the conversion-indication signal of the address converter for producing the second selection signal.

6. An apparatus as claimed in claim 5 for generating angle-modulated carrier signals in response to n-level data signals, further including also a non-linear correlative encoding circuit for converting the n-level data symbols into k-level data symbols where k is larger than n; and the address converter is responsive to said given number of successive k-level data symbols for producing addresses for non-decreasing phases $\phi(t)$ relative to an initial phase $\phi(t)=0$ rad. with state number z=0, and produces a conversion-indication signal for the selection signal generator.

7. An apparatus as claimed claim 1 for generating angle-modulated carrier signals, in which the change of the phase $\phi(t)$ per symbol interval of length T is not more than $\pm\phi/2$ rad. and the phase $\phi(t)$ within a symbol interval always remains in the same phase quadrant $[y\pi/2, (y+1)\pi/2]$ with quadrant number y, and the first read-only memory in the signal processor stores values representing the magnitude of signals cos $\phi(t)$ at first clock instants and values representing the magnitude of signals sin $\phi(t)$ at second clock instants for non-decreasing phases $\phi(t)$ in the first phase quadrant $(0, \pi/2)$ with quadrant number y=0, the first and second clock instants occurring alternately;

the counter for producing phase state numbers is a modulo-4 up/down counter whose counting position represents the quadrant number y modulo-4 of phase $\phi(t)$ for each symbol interval with 2 bits $y_1 y_0$; the selection signal generator produces a first selection signal which corresponds to the least significant bit $y_0$ of the quadrant number y modulo-4;

the address converter is responsive to both said given numbers of successive data symbols and said first selection signal corresponding to the least significant bit $y_0$ of quadrant number y modulo-4 for producing addresses for non-decreasing phases $\phi(t)$ in the first phase quadrant $(0, \pi/2)$ with quadrant number y=0, and a conversion indication signal; and the interpolation counter is a modulo-(4q+1) up/down counter, whose counting sense is controlled by said conversion indication signal.

* * * * *

UNITED STATES PATENT AND TRADEMARK OFFICE
CERTIFICATE OF CORRECTION

PATENT NO. : 4,686,688
DATED : August 11, 1987
INVENTOR(S) : Kah-Seng Chung et al It is certified that error appears in the above-identified patent and that said Letters Patent is hereby corrected as shown below:

IN THE CLAIMS

Claim 5, line 4    change $\pm\phi/2$ rad. to -- $\pm \pi/2$ rad. --

Claim 7, line 4    change $\pm\phi/2$ rad. to -- $\pm \pi/2$ rad. --

Signed and Sealed this

Eleventh Day of December, 1990

*Attest:*

HARRY F. MANBECK, JR.

*Attesting Officer*    *Commissioner of Patents and Trademarks*